(12) United States Patent
Van Duren et al.

(10) Patent No.: US 12,136,297 B2
(45) Date of Patent: Nov. 5, 2024

(54) ROAD USAGE CHARGING (RUC) DETERMINATION AND REPORTING TECHNIQUES

(71) Applicant: QUALCOMM Incorporated, San Diego, CA (US)

(72) Inventors: Drew Foster Van Duren, Templeton, CA (US); Sean Vincent Maschue, Encinitas, CA (US); Virendra Kumar, Sudbury, MA (US); William Whyte, Natick, MA (US); Jonathan Petit, Wenham, MA (US); Anthony Bahadir Lopez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 17/697,792

(22) Filed: Mar. 17, 2022

(65) Prior Publication Data

US 2023/0298388 A1  Sep. 21, 2023

(51) Int. Cl.
*G07B 15/06* (2011.01)
*G06Q 20/38* (2012.01)
*G07B 13/00* (2006.01)
*H04L 67/12* (2022.01)

(52) U.S. Cl.
CPC ............ *G07B 15/06* (2013.01); *G07B 13/00* (2013.01); *H04L 67/12* (2013.01); *G06Q 20/3829* (2013.01); *G06Q 2240/00* (2013.01)

(58) Field of Classification Search
CPC .... G07B 15/06; G07B 13/00; G06Q 20/3829; G06Q 2240/00; H04L 67/12
USPC ........................................................ 705/417
See application file for complete search history.

(56) References Cited

U.S. PATENT DOCUMENTS

| | | | |
|---|---|---|---|
| 10,832,570 B1* | 11/2020 | Ibrahim | G08G 1/096838 |
| 2017/0193026 A1* | 7/2017 | Pettovello | G06F 16/2282 |
| 2021/0183175 A1* | 6/2021 | Dunger | G06Q 20/145 |
| 2022/0092884 A1* | 3/2022 | Basir | G07B 15/063 |
| 2023/0056836 A1* | 2/2023 | Borras | G07B 15/02 |

(Continued)

FOREIGN PATENT DOCUMENTS

WO    WO-2019087314 A1 *  5/2019  ............. G06Q 20/02

OTHER PUBLICATIONS

Balasch, Josep et al. "PrETP: Privacy-Preserving Electronic Toll Pricing." USENIX Security Symposium https://www.semanticscholar.org/paper/PrETP%3A-Privacy-Preserving-Electronic-Toll-Pricing-Balasch-Rial/c648aba11077ef95764e3162766fbda5b1de8ef5 (Year: 2010).*

*Primary Examiner* — Shannon S Campbell
*Assistant Examiner* — Lisa Ma
(74) *Attorney, Agent, or Firm* — Holland & Hart LLP

(57) ABSTRACT

Methods, systems, and devices for road usage charging (RUC) are described. RUC computation may be performed at a vehicle using a vehicle computing device (VCD) that is trusted by a service provider, charger, or both. The VCD may be trusted to collect high accuracy, high resolution time and location data for RUC, and also compute for itself what the RUC charge is according to one or more applicable charge policies that are provided to the VCD. Anonymity related to specific vehicle and location information may be provided by encrypting portions of RUC data that are decryptable by different entities with reduced likelihood of revealing specific vehicle, location, and time information.

30 Claims, 23 Drawing Sheets

(56) References Cited

U.S. PATENT DOCUMENTS

2024/0095790 A1\* 3/2024 Vukovic ............ G06Q 30/0284
2024/0169765 A1\* 5/2024 Vukovic ............. G07B 15/063

\* cited by examiner

ROAD USAGE CHARGING (RUC) DETERMINATION AND REPORTING TECHNIQUES

FIELD OF TECHNOLOGY

The following relates to road usage charging, including road usage charging (RUC) determination and reporting techniques.

BACKGROUND

Various roadways and related transportation infrastructure are often constructed and maintained by public entities (e.g., federal, state, or local governments), private entities (e.g., private toll road operators), public-private partnerships, or various combinations thereof. Much of the funding for many roadways and related infrastructure is generated in the form of taxes, such as fuel taxes in which a certain tax is applied and charged when a vehicle is refueled (e.g., a federal or state tax per gallon (or liter) of fuel). Such fuel taxes as a mechanism to pay for road usage may not provide sufficient funds, an accurate reflection of a vehicle's actual road use, or combinations thereof. For example, as electrification of the vehicle fleet that uses roadways progresses, fuel taxes may be an insufficient and inequitable funding source.

SUMMARY

The described techniques relate to improved methods, systems, devices, and apparatuses that support road usage charging (RUC) determination and reporting techniques. In accordance with various aspects, the described techniques provide for RUC processing at a vehicle computing device (VCD) that is security-hardened and sufficiently trusted by a service provider (e.g., a network entity that collects RUC information and provides to charging entities), charger (e.g., a taxing authority or other type of infrastructure owner/operator that specifies a charge policy), or both. The VCD may be trusted to collect high accuracy, high resolution time and location data for RUC, and also compute for itself what the RUC charge is according to one or more applicable charge policies that are provided to the VCD. In some cases, anonymity related to specific vehicle and location information may be provided by encrypting portions of RUC data that are decryptable by different entities with reduced likelihood of revealing specific vehicle, location, and time information. Such techniques may enable a vehicle driver to operate more privately because the vehicle does not upload detailed time and location data to a service provider to calculate the RUC. Rather, the service provider can trust the vehicle's VCD-calculated RUC charges and remotely verify that the VCD is functioning correctly and securely.

A method for road usage charging at a vehicle computing device (VCD) is described. The method may include receiving at least a first encryption key of a first charging entity for encryption of road usage charges associated with the first charging entity, determining a first road usage charge associated with the first charging entity based on a first charge policy for road usage associated with the first charging entity, encrypting the first road usage charge based on the first encryption key to generate an encrypted first road usage charge, determining a total usage charge for road usage associated with the first charging entity and one or more other charging entities, and transmitting the encrypted first road usage charge and other encrypted road usage charges in conjunction with an unencrypted total usage charge to a network entity.

An apparatus for road usage charging at a vehicle computing device (VCD) is described. The apparatus may include a processor, memory coupled with the processor, and instructions stored in the memory. The instructions may be executable by the processor to cause the apparatus to receive at least a first encryption key of a first charging entity for encryption of road usage charges associated with the first charging entity, determine a first road usage charge associated with the first charging entity based on a first charge policy for road usage associated with the first charging entity, encrypt the first road usage charge based on the first encryption key to generate an encrypted first road usage charge, determine a total usage charge for road usage associated with the first charging entity and one or more other charging entities, and transmit the encrypted first road usage charge and other encrypted road usage charges in conjunction with an unencrypted total usage charge to a network entity.

Another apparatus for road usage charging at a vehicle computing device (VCD) is described. The apparatus may include means for receiving at least a first encryption key of a first charging entity for encryption of road usage charges associated with the first charging entity, means for determining a first road usage charge associated with the first charging entity based on a first charge policy for road usage associated with the first charging entity, means for encrypting the first road usage charge based on the first encryption key to generate an encrypted first road usage charge, means for determining a total usage charge for road usage associated with the first charging entity and one or more other charging entities, and means for transmitting the encrypted first road usage charge and other encrypted road usage charges in conjunction with an unencrypted total usage charge to a network entity.

A non-transitory computer-readable medium storing code for road usage charging at a vehicle computing device (VCD) is described. The code may include instructions executable by a processor to receive at least a first encryption key of a first charging entity for encryption of road usage charges associated with the first charging entity, determine a first road usage charge associated with the first charging entity based on a first charge policy for road usage associated with the first charging entity, encrypt the first road usage charge based on the first encryption key to generate an encrypted first road usage charge, determine a total usage charge for road usage associated with the first charging entity and one or more other charging entities, and transmit the encrypted first road usage charge and other encrypted road usage charges in conjunction with an unencrypted total usage charge to a network entity.

Some examples of the method, apparatuses, and non-transitory computer-readable medium described herein may further include operations, features, means, or instructions for encrypting at least a second road usage charge based on the first encryption key associated with the first charging entity or a second encryption key associated with a second charging entity to generate an encrypted second road usage charge, where the second road usage charge may be either a real charge having a positive charge value or a false charge having a zero charge value and transmitting the encrypted second road usage charge along with the encrypted first road usage charge and the unencrypted total usage charge, to the network entity. In some examples of the method, apparatuses, and non-transitory computer-readable medium described herein, the encrypted second road usage charge, the encrypted first road usage charge, and the unencrypted total usage charge is transmitted with an indication of a respective charging entity identification associated with each charge.

In some examples of the method, apparatuses, and non-transitory computer-readable medium described herein, the encrypted first road usage charge includes a charge amount and one or more of an identifier or charging policy identification associated with the first road usage charge and the network entity generates total of ciphertext charges for a given charging policy identification such that a given charger is informed of revenue quantities as a function of charge policy. In some examples of the method, apparatuses, and non-transitory computer-readable medium described herein, the first encryption key is associated with an additively homomorphic encryption (AHE) scheme and one or more other encryption keys is received for one or more other charging entities for reporting, using AHE, one or more other road usage charges. Some examples of the method, apparatuses, and non-transitory computer-readable medium described herein may further include operations, features, means, or instructions for receiving, from the first charging entity or from a service provider or network entity associated with one or more charging entities, the first charge policy associated with the first charging entity.

Some examples of the method, apparatuses, and non-transitory computer-readable medium described herein may further include operations, features, means, or instructions for receiving one or more of an attestation check or an integrity check and transmitting a response to one or more of the attestation check or the integrity check, and where determination of first road usage charge at the VCD is enabled based on successful completion of one or more of the attestation check or the integrity check. In some examples of the method, apparatuses, and non-transitory computer-readable medium described herein, the first charge policy includes one or more parameters that enable determination of the first road usage charge at the VCD based on one or more of a location of a vehicle associated with the VCD or a time at which the vehicle was at the location. In some examples of the method, apparatuses, and non-transitory computer-readable medium described herein, the one or more parameters include roadway map information that enables the VCD to associate vehicle location data with the first charge policy to determine the first road usage charge.

Some examples of the method, apparatuses, and non-transitory computer-readable medium described herein may further include operations, features, means, or instructions for cryptographically verifying that the first charge policy is valid prior to determining the first road usage charge using the first charge policy. Some examples of the method, apparatuses, and non-transitory computer-readable medium described herein may further include operations, features, means, or instructions for receiving the first charge policy from a network entity via one or more of a cellular interface, a vehicle-to-everything (V2X) interface, a roadside unit (RSU), a dedicated short range communications (DSRC) service, or point-to-point communication. Some examples of the method, apparatuses, and non-transitory computer-readable medium described herein may further include operations, features, means, or instructions for receiving one or more updates to one or more charge policies based on a location of a vehicle associated with the VCD, or based on an anonymous request from the VCD as a function of a current location or one or more planned locations of the vehicle associated with the VCD. In some examples of the method, apparatuses, and non-transitory computer-readable medium described herein, the first charge policy includes one or more charging parameters that may be based on a vehicle type of a vehicle associated with the VCD, a capability of the VCD to provide predefined inputs to a road usage charge according to the first charge policy, or any combinations thereof.

A method for road usage charging at a network entity is described. The method may include providing to one or more vehicle-associated vehicle computing devices (VCDs), at least a first encryption key of a first charging entity for encryption of one or more road usage charge associated with the first charging entity for each VCD, providing to the one or more vehicle-associated VCDs, a second encryption key of a second charging entity for encryption of one or more road usage charges associated with the second charging entity for each VCD, receiving a first set of encrypted road usage charges from each VCD associated with the first charging entity and a second set of encrypted road usage charges from each VCD associated with the second charging entity, receiving an unencrypted total charge from each VCD that indicates a VCD-specific sum of total road usage charges for all of the charging entities, determining a first encrypted total road usage charge for the first charging entity based on each of the first sets of encrypted road usage charges associated with the first charging entity, and determining a second encrypted total road usage charge for the second charging entity based on each of the second sets of encrypted road usage charges associated with the second charging entity.

An apparatus for road usage charging at a network entity is described. The apparatus may include a processor, memory coupled with the processor, and instructions stored in the memory. The instructions may be executable by the processor to cause the apparatus to provide to one or more vehicle-associated vehicle computing devices (VCDs), at least a first encryption key of a first charging entity for encryption of one or more road usage charge associated with the first charging entity for each VCD, provide to the one or more vehicle-associated VCDs, a second encryption key of a second charging entity for encryption of one or more road usage charges associated with the second charging entity for each VCD, receive a first set of encrypted road usage charges from each VCD associated with the first charging entity and a second set of encrypted road usage charges from each VCD associated with the second charging entity, receive an unencrypted total charge from each VCD that indicates a VCD-specific sum of total road usage charges for all of the charging entities, determine a first encrypted total road usage charge for the first charging entity based on each of the first sets of encrypted road usage charges associated with the first charging entity, and determine a second encrypted total road usage charge for the second charging entity based on each of the second sets of encrypted road usage charges associated with the second charging entity.

Another apparatus for road usage charging at a network entity is described. The apparatus may include means for providing to one or more vehicle-associated vehicle computing devices (VCDs), at least a first encryption key of a first charging entity for encryption of one or more road usage charge associated with the first charging entity for each VCD, means for providing to the one or more vehicle-associated VCDs, a second encryption key of a second charging entity for encryption of one or more road usage charges associated with the second charging entity for each VCD, means for receiving a first set of encrypted road usage charges from each VCD associated with the first charging entity and a second set of encrypted road usage charges from each VCD associated with the second charging entity, means for receiving an unencrypted total charge from each VCD that indicates a VCD-specific sum of total road usage charges for all of the charging entities, means for determining a first encrypted total road usage charge for the first charging entity based on each of the first sets of encrypted road usage charges associated with the first charging entity, and means for determining a second encrypted total road usage charge for the second charging entity based on each of the second sets of encrypted road usage charges associated with the second charging entity.

A non-transitory computer-readable medium storing code for road usage charging at a network entity is described. The code may include instructions executable by a processor to provide to one or more vehicle-associated vehicle computing devices (VCDs), at least a first encryption key of a first charging entity for encryption of one or more road usage charge associated with the first charging entity for each VCD, provide to the one or more vehicle-associated VCDs, a second encryption key of a second charging entity for encryption of one or more road usage charges associated with the second charging entity for each VCD, receive a first set of encrypted road usage charges from each VCD associated with the first charging entity and a second set of encrypted road usage charges from each VCD associated with the second charging entity, receive an unencrypted total charge from each VCD that indicates a VCD-specific sum of total road usage charges for all of the charging entities, determine a first encrypted total road usage charge for the first charging entity based on each of the first sets of encrypted road usage charges associated with the first charging entity, and determine a second encrypted total road usage charge for the second charging entity based on each of the second sets of encrypted road usage charges associated with the second charging entity.

In some examples of the method, apparatuses, and non-transitory computer-readable medium described herein, one of the first set of encrypted road usage charges or the second set of encrypted road usage charges may be a false charge having a zero charge value that obscures information related to specific vehicle time and usage associated with one or more charging entities or associated charge policies. In some examples of the method, apparatuses, and non-transitory computer-readable medium described herein, the network entity may be a service provider that relays charge information to one or more of the first charging entity or the second charging entity, or may be the first charging entity.

In some examples of the method, apparatuses, and non-transitory computer-readable medium described herein, the encrypted first encrypted total road usage charge further includes an indication of a first charge policy associated with the first charging entity that was used to compute the first encrypted total road usage charge. In some examples of the method, apparatuses, and non-transitory computer-readable medium described herein, the first encryption key is associated with an additively homomorphic encryption (AHE) scheme.

Some examples of the method, apparatuses, and non-transitory computer-readable medium described herein may further include operations, features, means, or instructions for providing the first encrypted total road usage charge to the first charging entity, and the second encrypted total road usage charge to the second charging entity, receiving the first road usage charge and the second road usage charge from, respectively, the first charging entity and the second charging entity, and verifying each of the first road usage charge and the second road usage charge based on a difference between the unencrypted total charge from the first VCD and a sum of the first road usage charge and the second road usage charge. Some examples of the method, apparatuses, and non-transitory computer-readable medium described herein may further include operations, features, means, or instructions for transmitting, to a vehicle operator associated with the VCD, a charge notice that corresponds to the sum of the total road usage charges for each charging entity. Some examples of the method, apparatuses, and non-transitory computer-readable medium described herein may further include operations, features, means, or instructions for transmitting, to the VCD, a first charge policy associated with the first charging entity, and where the VCD computes the first set of encrypted road usage charges that is reported to the first charging entity based on the first charge policy.

Some examples of the method, apparatuses, and non-transitory computer-readable medium described herein may further include operations, features, means, or instructions for enabling assurance of correct self-reporting of at least the first set of encrypted road usage charges by the VCD based on an remote attestation, one or more integrity checks, or any combinations thereof. Some examples of the method, apparatuses, and non-transitory computer-readable medium described herein may further include operations, features, means, or instructions for providing, to the VCD, one or more road usage charge calculation test vectors and an indication to perform a self-test based on the charge calculation test vectors, receiving, from the VCD, a calculated charge determined at the VCD based on the charge calculation test vectors, and verifying that the VCD computes an accurate calculated charge.

In some examples of the method, apparatuses, and non-transitory computer-readable medium described herein, where the one or more parameters allow the VCD to determine pre-trip, mid-trip, or post-trip, charge discounts that may be applied to individual or total road usage charges. Some examples of the method, apparatuses, and non-transitory computer-readable medium described herein may further include operations, features, means, or instructions for transmitting one or more updates to one or more charge policies based on a location of the vehicle associated with the VCD, a schedule, or based on an anonymous request from the VCD.

DETAILED DESCRIPTION

Figure 1:
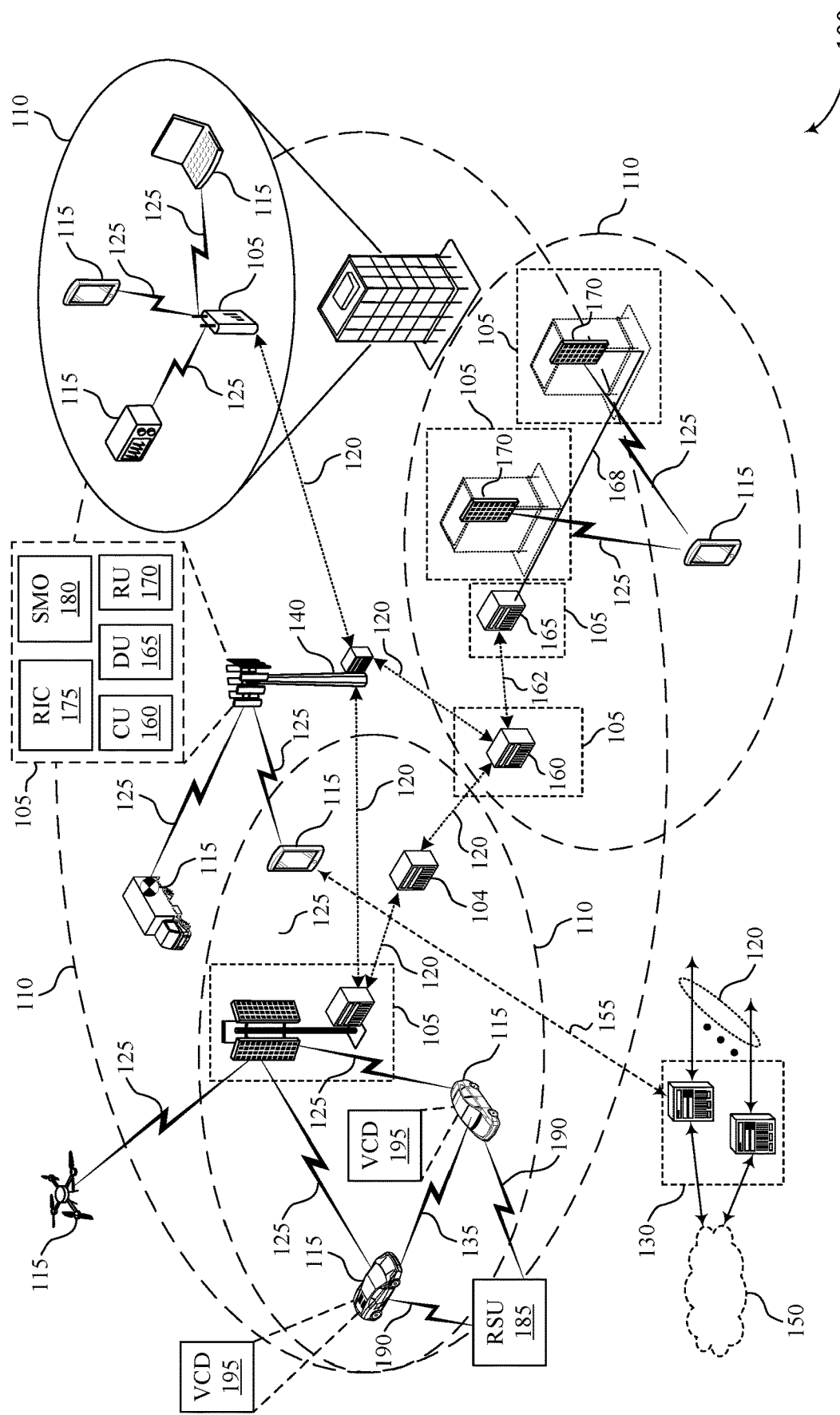
FIG. 1 illustrates an example of a wireless communications system that supports road usage charging (RUC) determination and reporting techniques in accordance with one or more aspects of the present disclosure.

Increased market penetration of electrified vehicles, such as battery electric vehicles (BEVs) and plug-in hybrid electric vehicles (PHEVs), result in reduced consumption of vehicle fuel (e.g., gasoline, diesel, ethanol, etc.). However, authorities that construct and maintain roadways often obtain a substantial portion of their funding from fuel taxes that are collected each time a vehicle refuels at a filling station. As a larger percentage of road usage is from electrified vehicles, roadway authorities collect less fuel tax revenue for the same amount of road usage, which may result in significant funding shortfalls for construction and maintenance of transportation infrastructure. Thus, over time, losses in fuel tax revenue may impair the ability of transportation agencies to sustain and maintain roadways and other transportation infrastructure. Various Road Usage Charging (RUC) initiatives exist or have been proposed, which in many cases include vehicles or vehicle owner/operators centrally reporting potentially privacy-sensitive time and location information either to the state, a 3rd party account manager (e.g., a service provider) or other commercial service provider. Many vehicle owners/operators are opposed to providing such information to other parties, due to privacy concerns. The fuel tax model of 'pay at the pump' tax collection does not create such privacy concerns, and public and political acceptance of RUC systems may depend on sufficient levels of anti-tracking privacy.

Various techniques as discussed herein provide for RUC computation and reporting that help protect the privacy of vehicle owners/operators, while also allowing accurate charging for actual road usage. In some cases, RUC may be computed at a vehicle itself using a vehicle computing device (VCD). The VCD, in some cases, is security-hardened and sufficiently trusted by a service provider and/or charging entity to collect high accuracy, high resolution time and location data for road usage charging. Further, in accordance with various aspects, the VCD computes the RUC itself according to one or more charge policies. Such techniques enable the vehicle operator to function more privately because the VCD, vehicle, or other tracking device, does not upload detailed time and location data associated with RUC charging. Various aspects provide techniques for VCD audit and trust functions, as well as privacy and unlinkability of a VCD with a particular charge, location or charging entity. Techniques are also provided to distribute an authenticated charge policy (or multiple charge policies) to the vehicle VCD so the vehicle may perform the charge calculation. Privacy and unlinkability may be provided through a service provider or charging entity by providing an encryption key to the VCD, and the VCD encrypting corresponding RUCs based on the encryption key of the associated charging entity. The encrypted RUCs for each charging entity may be transmitted by the VCD (e.g., via wireless communications), along with an unencrypted total charge. The total charge may be used to compare against decrypted RUCs to verify the decrypted values are correct. In some cases, one or multiple zero charges (e.g., referred to as bogus charges or false charges) for different charging entities may be reported to further obscure RUCs associated with other charging entities.

Such techniques may allow for accurate charging while helping to preserve operator privacy, which may be applied in cases where a charger (e.g., a charging entity such as a state or municipality) is associated with a relatively small area. For example, some cities may implement congestion charges in which vehicles are charged for operating in congested areas (e.g., downtown areas) during certain times. In a congestion pricing RUC, vehicle distance (e.g., 'road consumption') may be tracked to a smaller area, corridor, time, or any combinations thereof, to determine total charge according to a corresponding charge policy. In some cases, if a vehicle operator were to simply report a RUC for such an area, it may be possible to determine their location was within a relatively small area during a particular time period. Techniques as discussed herein can help reduce privacy concerns by allowing a VCD to compute charges directly and report only the charge (e.g., and not location and time information), and also provide for encryption of the charge data according to an encryption key associated with a particular charger. Thus, different chargers or network entities are unable to view RUCs associated with other chargers.

Aspects of the disclosure are initially described in the context of wireless communications systems. Aspects are then described with reference to RUC computation and reporting systems and associated techniques. Aspects of the disclosure are further illustrated by and described with reference to apparatus diagrams, system diagrams, and flowcharts that relate to RUC determination and reporting techniques.

FIG. 1 illustrates an example of a wireless communications system 100 that supports RUC determination and reporting techniques in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support RUC determination and reporting techniques as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units (RSUs) 185 via links 190 (which may be examples of D2D communication links via a device-to-device interface such as a PC5 interface), or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, vehicles may use wireless communications system 100 to report RUC to a network entity associated with a RUC service provider or a charging entity. In some cases, RUC processing may be performed at a VCD 195 associated with a UE 115 (e.g., on a vehicle), where the VCD 195 is security-hardened and sufficiently trusted by a service provider (e.g., a network entity that collects RUC information and provides to charging entities), charger (e.g., a taxing authority or other type of infrastructure owner/operator that specifies a charge policy), or both. The VCD 195 may be trusted to collect high accuracy, high resolution time and location data for RUC, and also compute for itself what the RUC charge is according to one or more applicable charge policies that are provided to the VCD 195. In some cases, anonymity related to specific vehicle and location information may be provided by encrypting portions of RUC data that are decryptable by different entities with reduced likelihood of revealing specific vehicle, location, and time information. Such techniques may enable a vehicle driver to operate more privately because the vehicle does not upload detailed time and location data to a service provider to calculate the RUC. Rather, the service provider can trust the vehicle's VCD-calculated RUC charges and remotely verify that the VCD 195 is functioning correctly and securely.

Figure 2:
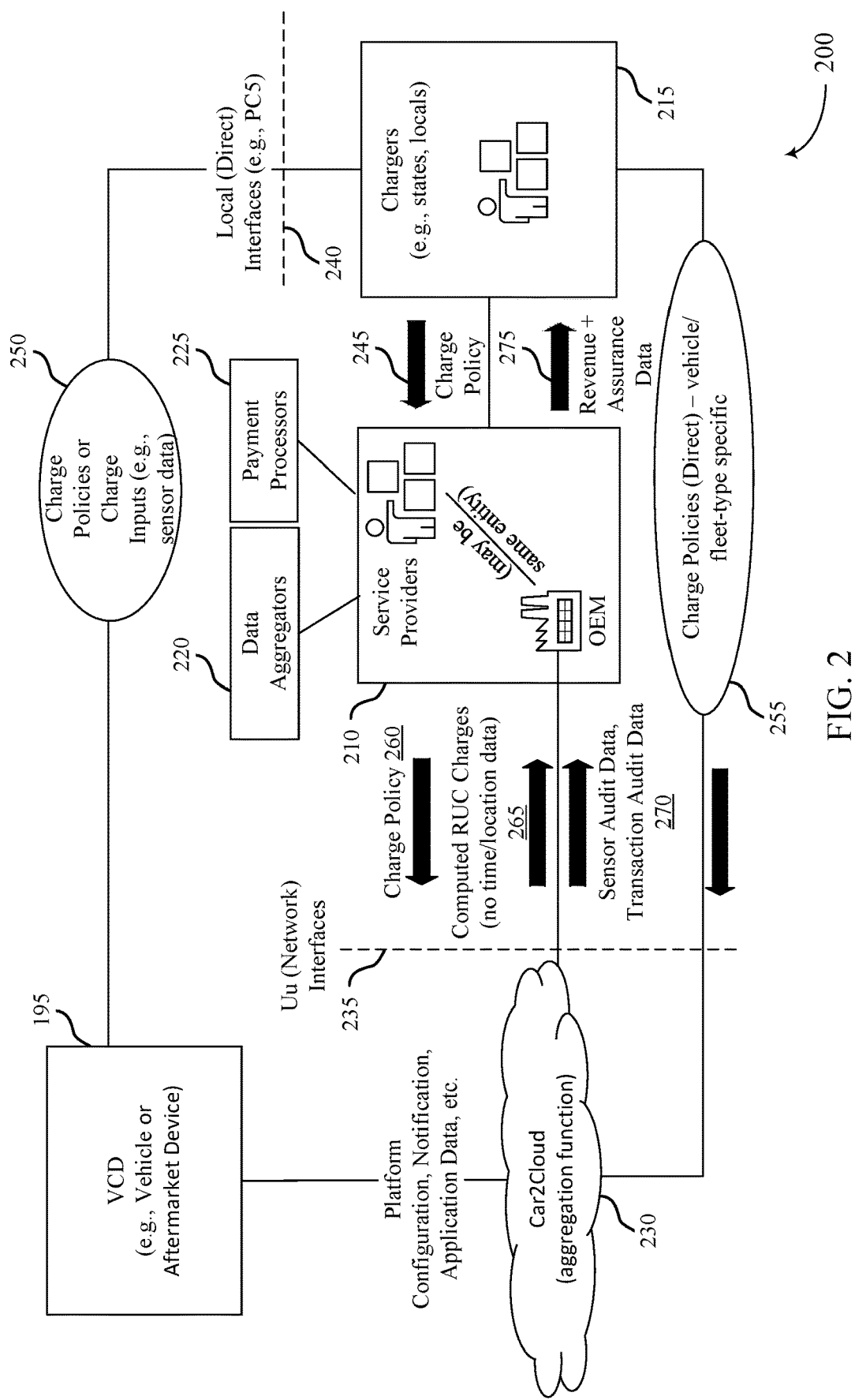
FIG. 2 illustrates an example of a vehicle charging determination and reporting system that supports RUC determination and reporting techniques in accordance with one or more aspects of the present disclosure.

FIG. 2 illustrates an example of a vehicle charging determination and reporting system 200 that supports RUC determination and reporting techniques in accordance with one or more aspects of the present disclosure. The vehicle charging determination and reporting system 200 may use wireless communications for reporting RUC information via wireless communications system 100 as discussed with reference to FIG. 1, for example. In the example of FIG. 2, a VCD 195 may perform RUC computations that are provided to one or more service providers 210 and one or more chargers 215. In some cases, service providers 210 may have data aggregators 220 that aggregate data across multiple VCDs 195 prior to reporting information to chargers 215, and may have payment processors 225 that perform revenue management and payment functions for chargers as well as vehicle operators. In some cases, the VCD 195 may be coupled with a UE (e.g., a UE 115 of FIG. 1 that is integrated with the vehicle or that is a separate component installed in a vehicle), and may communicate with service providers 210, chargers 215, or any combinations thereof, via a wireless network. For example, VCD 195 may communicate using an aggregation function 230 (e.g., a Car-to-cloud aggregation function) and Uu interfaces 235 of a cellular network (e.g., a 4G/5G network). Additionally or alternatively, the VCD 195 may communicate via one or more local/direct interfaces 240 (e.g., with one or more RSUs via PC5 interfaces) with chargers 215, service providers 210, or both.

As discussed herein, RUC based on distance traveled or other road usage definitions can in some cases raise privacy concerns if vehicle locations and times at locations are reported to one or more different entities for purposes of RUC computations. Furthermore, even if a data broker or service provider 210 were to aggregate and anonymize vehicle operators' RUC data, the sensitive raw data may still vulnerable to comprise, unintentional disclosure and subpoena prior to the aggregation and anonymization functions being performed. In accordance with various aspects, chargers 215 and service providers 210 may receive computed RUC information from the VCD 195. As used herein, a charger 215 refers to an entity who charges roadway users for the use of the infrastructure. This may be a state, county, local bridge authority or other type of infrastructure owner/operator who specifies a charge policy (a rule set by which a total charge is computed). In some cases, a charger 215 may provide charge policies 245 to service providers 210, which in turn provide charge policies 260 to the VCD 195 (e.g., via Uu interface 235). In some cases, a charger 215 may provide charge policies 255 to the VCD 195 via Uu interface 235 and the aggregation function 230. Further, a charger may provide charge policies 250 to the VCD 195 local/direct interfaces 240 (e.g., via a RSU). In some aspects, different chargers 215 may provide charge policies via one or more of such described paths (e.g., congestion charge policies may be provided in charge policies 250 via an RSU, and state RUC charge policies may be provided in charge policies 245 via service providers 210).

A service provider 210 may refer to an entity that has a direct relationship with the driver and vehicle, is responsible for tracking the vehicle's road usage, charges the driver (e.g., using a payment processor 225) according to the charger's 245 charge policy 245, and distributes revenue to the charger 215. A service provider 210 may be an automotive OEM, for example, or some other commercial account management entity. The VCD 195 collects and records location and/or distance-based travel information. Some non-limiting examples of a VCD 195 may include a plug-in dongle connected to a vehicle on-board diagnostics (OBD) port (e.g., an OBD2 port) or an integrated Telematics Control Unit (TCU) that is able to collect and compute location and distance-traveled data directly from vehicle sensors. In some cases, VCDs 195 that are tightly integrated into the vehicle electronics and sensors may have improved, direct and secure access to raw vehicle sensor data, and an enhanced ability to preserve driver privacy by verifying the correctness of such data without exporting it to other systems and third parties. A VCD may also be comprised of off-vehicle devices associated with the driver, such as handheld devices and smart phones that are configured to compute and report RUC information.

As discussed herein, the VCD 195, in some cases, is security-hardened and sufficiently trusted by a service provider 210, chargers 215, or both, to not only collect high accuracy, high resolution time and location data for road usage charging, but also compute for itself what the RUC charge is according to the appropriate charge policy that is distributed to the VCD 195. The VCD 195 may compute RUC directly, and report computed RUC 265 to service providers 210, which may provide revenue and assurance data 275 to chargers 215 (e.g., with data from data aggregators 220 for multiple vehicles) and communicate with payment processors 225 to facilitate payment of RUCs. In some cases, the VCD 195 may provide sensor audit data 270, transaction audit data, or both, to service providers 210 to provide verification of proper RUCs. This enables the vehicle to operate more privately because the vehicle does not need to upload detailed time and location data to a service provider 210 to calculate the charge. Rather, the service provider 210 can trust the vehicle's VCD-calculated RUC charges and remotely verify that the VCD 195 is functioning correctly and securely. Such techniques provide for enhanced privacy for drivers while transportation and tax authorities can continue to collect taxes for transportation improvements. Enhancement of privacy may be an important consideration for broad scale legislative support for RUC type of transportation revenue collection. Furthermore, RUC systems that are able to preserve driver privacy may also perform 'Local RUC' charging (e.g., congestion charging, bridge toll charging, etc.) which has the benefit of being able to supplant more expensive, high infrastructure overhead tolling systems. VCD 195 audit and trust functions, and privacy protection techniques, for various aspects are discussed in more detail with reference to FIGS. 3 through 7.

Figure 3:
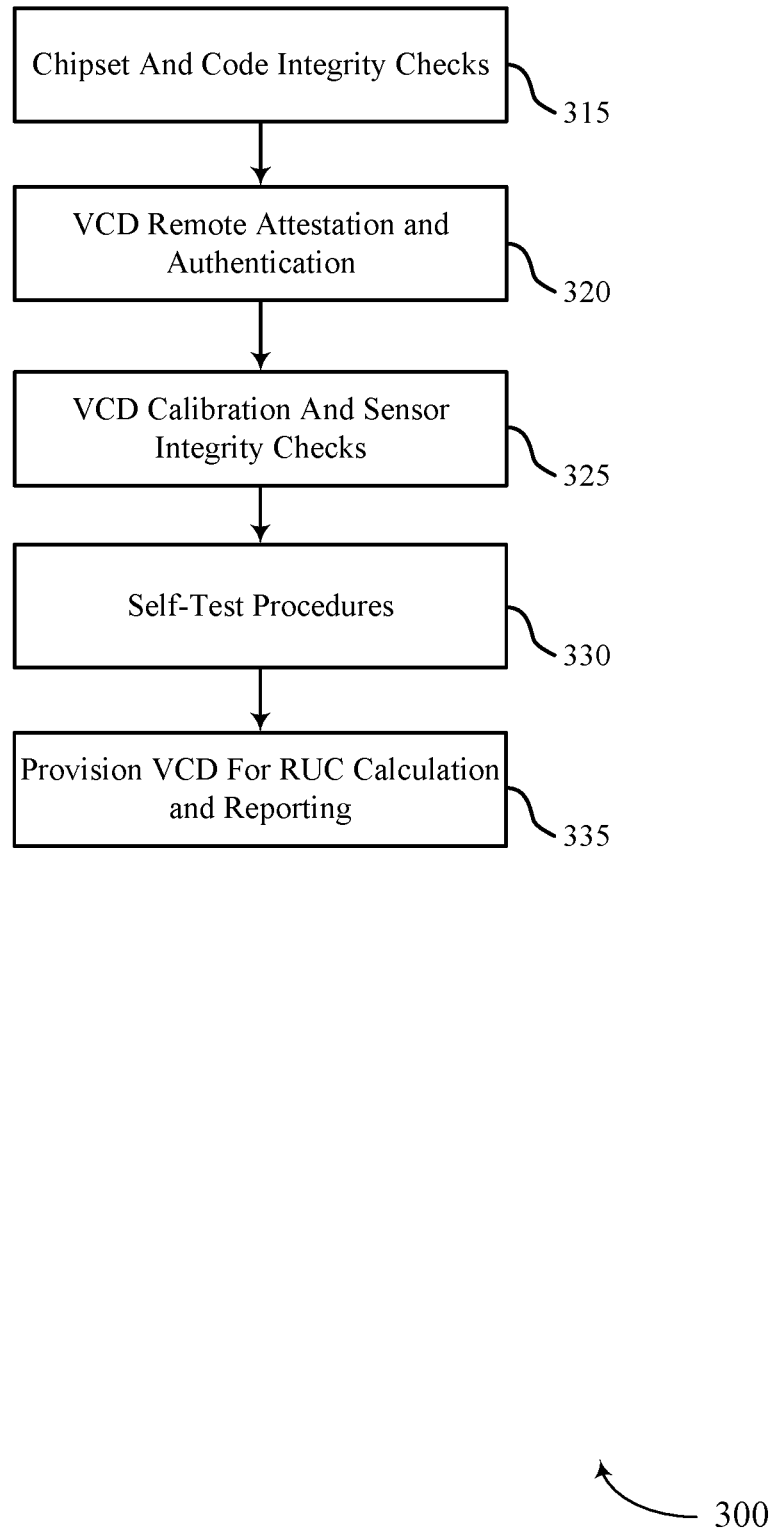
FIG. 3 illustrates a flow chart for vehicle computing device (VCD) authentication, integrity, and calibration that supports RUC determination and reporting techniques in accordance with one or more aspects of the present disclosure.

FIG. 3 illustrates a flow chart for VCD authentication, integrity, and calibration 300 that supports RUC determination and reporting techniques in accordance with one or more aspects of the present disclosure. VCD authentication, integrity, and calibration 300 may be performed, for example, by a VCD 195 of FIG. 1 or 2. In various aspects, in order to trust the vehicle VCD to perform RUC charge calculations, a number of functions may be performed between the VCD a network entity such as a service provider. Alternative examples of the following may be implemented, where some processes are performed in a different order than described or are not performed. In some cases, processes may include additional features not mentioned below, or further processes may be added.

In this example, at 315, the VCD may perform chipset and code integrity checks. In some cases, the vehicle VCD integrity will be secured to the chipset level for all sensitive code that calculates RUC Charges. Integrity checks can either be periodically reported or reported on demand from the VCD to the service provider.

At 320, the VCD may perform remote attestation and authentication. In some cases, the vehicle VCD may support remote attestation such that the service provider, or a trusted broker, may validate the integrity and authenticity of 1) VCD software/firmware, 2) self-test logic, 3) stored charge policies, 3) audit logic, 5) audit records, 6) cryptographic key material, 7) previous RUC charge calculation outputs such as cryptographic hashes, or any combinations thereof.

At 325, the VCD may perform calibration and sensor integrity checks. In some cases, the vehicle VCD may perform calibration and integrity checks directly on sensors (e.g., vehicle sensors integrated in the vehicle, such as a vehicle odometer, anti-lock brake system sensors that monitor wheel rotation, GPS sensors, etc.) or over sensor data feeds to ensure that they provide reliable distance, location and time information for use in RUC calculations (e.g., the VCD may eliminate wheel diameter errors in odometer readings by computing wheel diameters based on wheel ticks and GPS distance data).

At 330, the VCD may perform one or more self-test procedures. For example, a charger or service provider may periodically transmit, to a vehicle VCD, RUC calculation test vectors along with instructions to perform a complete self-test using given inputs or the vehicle's own sensor inputs to produce a known RUC charge output. In some cases, the VCD may receive the testing information, compute the RUC charge, and provide the computed charge to the entity that requested the self-test. In some cases, the entity that requests the self-test (e.g., service provider or charger) may confirm accurate RUC information is provided by the VCD, and confirm that the VCD is a trusted device.

At 335, the VCD may be provisioned for RUC calculation and reporting. In some cases, the VCD may be provided with one or more charge policies (e.g., based on vehicle location or planned locations based on a map or routing information), which may be used for RUC determination at the UE. In some cases, the RUC charge along with distance, location, time, map and other data used as inputs to calculate the RUC charge may be securely stored on the vehicle (e.g., in encrypted form), or may be encrypted by the vehicle or driver and uploaded to a networked server for short or long-term storage (e.g., such that no entity may be able to view the data if subpoenaed). Such techniques provide that trust of the vehicle's calculations can be assured such that the RUC charge calculations can be performed on-vehicle and driver privacy enhanced.

Figure 4:
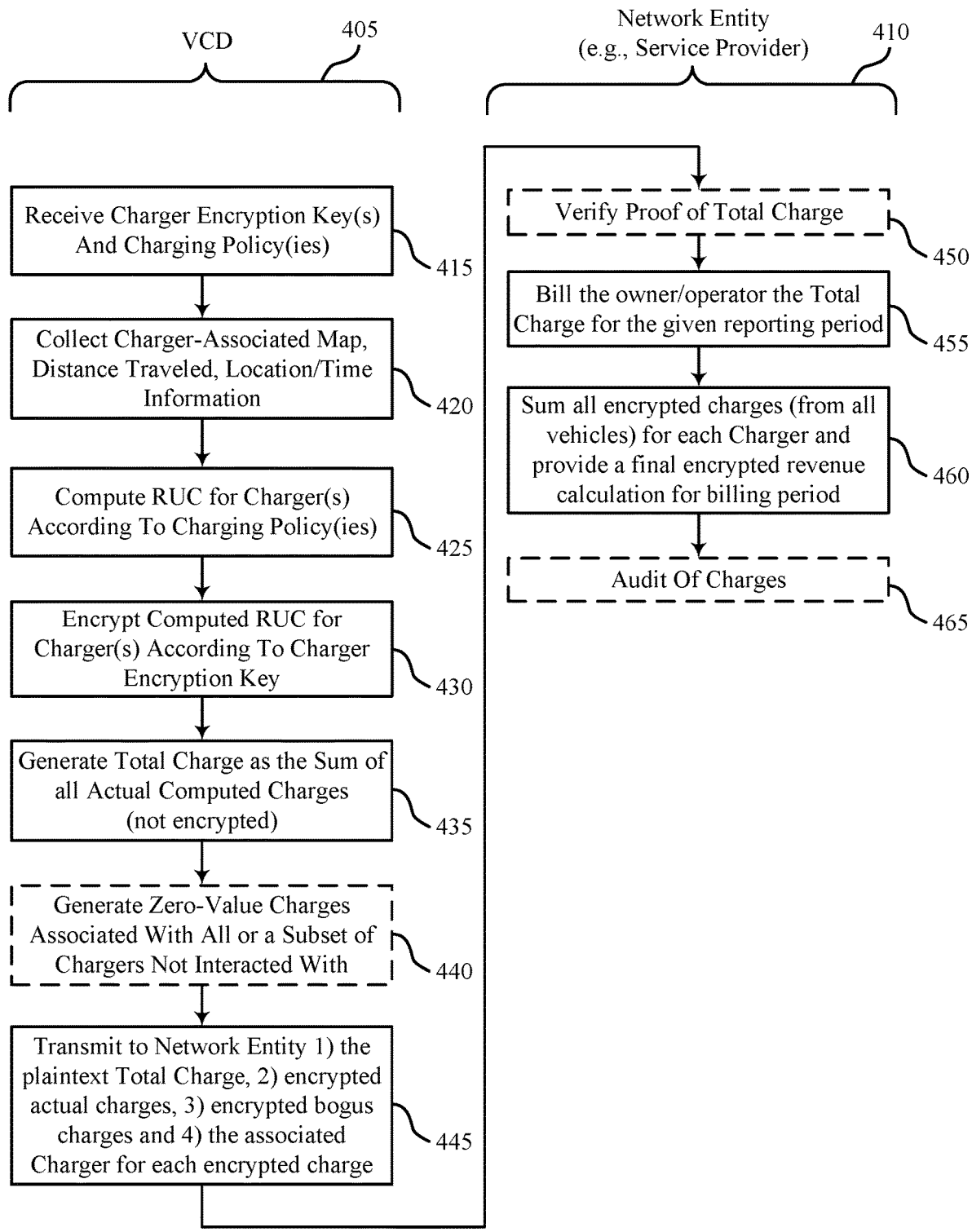
FIG. 4 illustrates a flow chart for privacy protection that supports RUC determination and reporting techniques in accordance with one or more aspects of the present disclosure.

FIG. 4 illustrates a flow chart for privacy protection 400 that supports RUC determination and reporting techniques in accordance with one or more aspects of the present disclosure. Privacy protection 400 may be performed, for example, by a VCD 405 and network entity (e.g., a service provider or charger) of FIG. 1 or 2. In various aspects, in order to enhance vehicle operator privacy, a number of functions may be performed between the VCD 405 the network entity 410. Alternative examples of the following may be implemented, where some processes are performed in a different order than described or are not performed. In some cases, processes may include additional features not mentioned below, or further processes may be added.

As discussed herein, the privacy of the driver or vehicle owner/operator may be important for public acceptance of a RUC system. While a driver or vehicle may be directly associated with a single service provider collecting charge information, a driver may be indirectly associated with (e.g., tracked) relative to any number of chargers by virtue of generating or reporting a computed charge. If a charger's area of responsibility, a charge policy applicability area, or both, is small, such as a roadway segment, small region, bridge, etc., as may be the case in 'Local RUC' charging models (e.g., congestion-based charges), then reporting a charge associated with that charger or charger policy may associate the driver and vehicle to a narrow location and time. Thus, without additional privacy protections beyond eliminating the reporting of time, location and distance, privacy is still lost and location history easily discovered by an account manager or other entity. Techniques as discussed herein allow for further enhancements to privacy protection in RUC, Local RUC and toll systems, which may be implemented in accordance with various techniques provided herein.

In the example of FIG. 4, at 415, the VCD 405 may receive one or more charger encryption keys and one or more charging policies. In some cases, each charger has a unique encryption key for an additively homomorphic encryption (AHE) scheme. A RUC-enabled VCD may be provisioned with encryption keys of chargers that it is anticipated to interact with (e.g., based on vehicle history, proximity to a current location, routing information provided in a mapping application, etc.).

At 420, the VCD 405 may collect charger-associated map, distance traveled, location, and time information. In some cases, such information may be obtained based on various vehicle sensors or sensors associated with the VCD (e.g., odometer and UPS location/time data, etc.).

At 425, the VCD 405 may compute a RUC for each relevant charger according to the corresponding charging policy or charging policies of the charger. As discussed, the RUC may be computed directly at the VCD 405 using the provided charging policies.

At 430, the VCD 405 may encrypt each computed RUC for the relevant chargers according to the encryption key associated with that charger. As discussed, each charger may provide a separate encryption key, which is used to encrypt the associated charge data at the VCD.

At 435, the VCD 405 may generate a total charge that is reported as a sum of all actual computed charges. In some aspects, the total charge value is not encrypted by the VCD 405, but left in plain text.

At 440, optionally for enhanced privacy, the VCD 405 may generate one or more bogus zero-value charges associated with all or a subset of chargers or charge policies that the VCD 405 is aware of but did not interact with. Such a procedure of adding zero-value charges may add obscurity to the vehicle's traversal through the roadway system and interaction with chargers or charge policies. Zero-value charges, when encrypted, are not discernible as a bogus charge, thus the service provider's ability to reliably track a vehicle's location history is significantly reduced.

Figure 6:
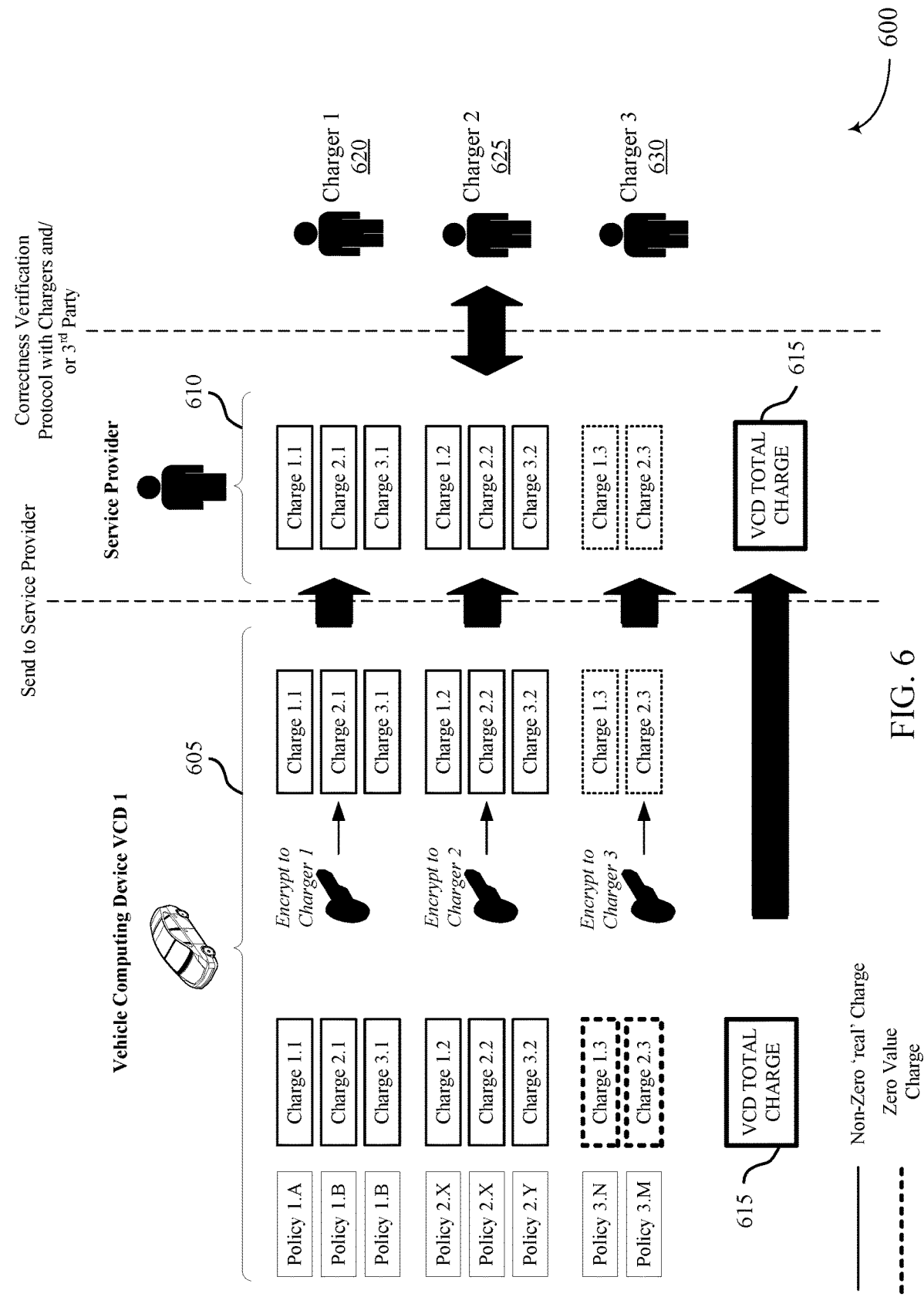
FIGS. 6 and 7 illustrate examples RUC charge encryption and communication that support RUC determination and reporting techniques in accordance with one or more aspects of the present disclosure.

At 445, the VCD 405 may transmit (e.g., via a wireless communications network) to the network entity 1) the plaintext total charge, 2) encrypted actual charges, 3)

encrypted bogus zero-value charges and 4) the associated charger for each encrypted charge. In some cases, the VCD 405 may also include in the encryption an identifier or reference to the charge policy used for each charge (e.g., as illustrated in FIG. 6 that is discussed below) and zero value bogus charge.

At 450, optionally, the network entity 410 (e.g., service provider) responsible for collecting charges and paying revenue to the charger(s) may receive the total charge for the vehicle's reporting period and verify proof of the total charge (e.g., that the sum of the individually encrypted charges is equal to the plaintext total charge). For example, some combination of additive homomorphic encryption, application of zero knowledge proofs, or use of a trusted, privacy-preserving protocol with the charger, may be used to determine the sum of the individually encrypted charges. In some cases, the use of additive homomorphic encryption enhances the privacy of the vehicle from the service provider and adds additional assurances of correctness, as such processes will not expose which are the zero-value 'bogus' (or false) charges. In other cases, the network entity 410 may trust the total charge value inherently (e.g., based on the security assurances of the VCD platform and its own data source integrity).

At 455, the network entity may bill the vehicle owner/operator the total charge for the given reporting period. In some cases, the network entity 410 may coordinate with one or more payment processors to provide the bill to the vehicle owner/operator.

Figure 7:
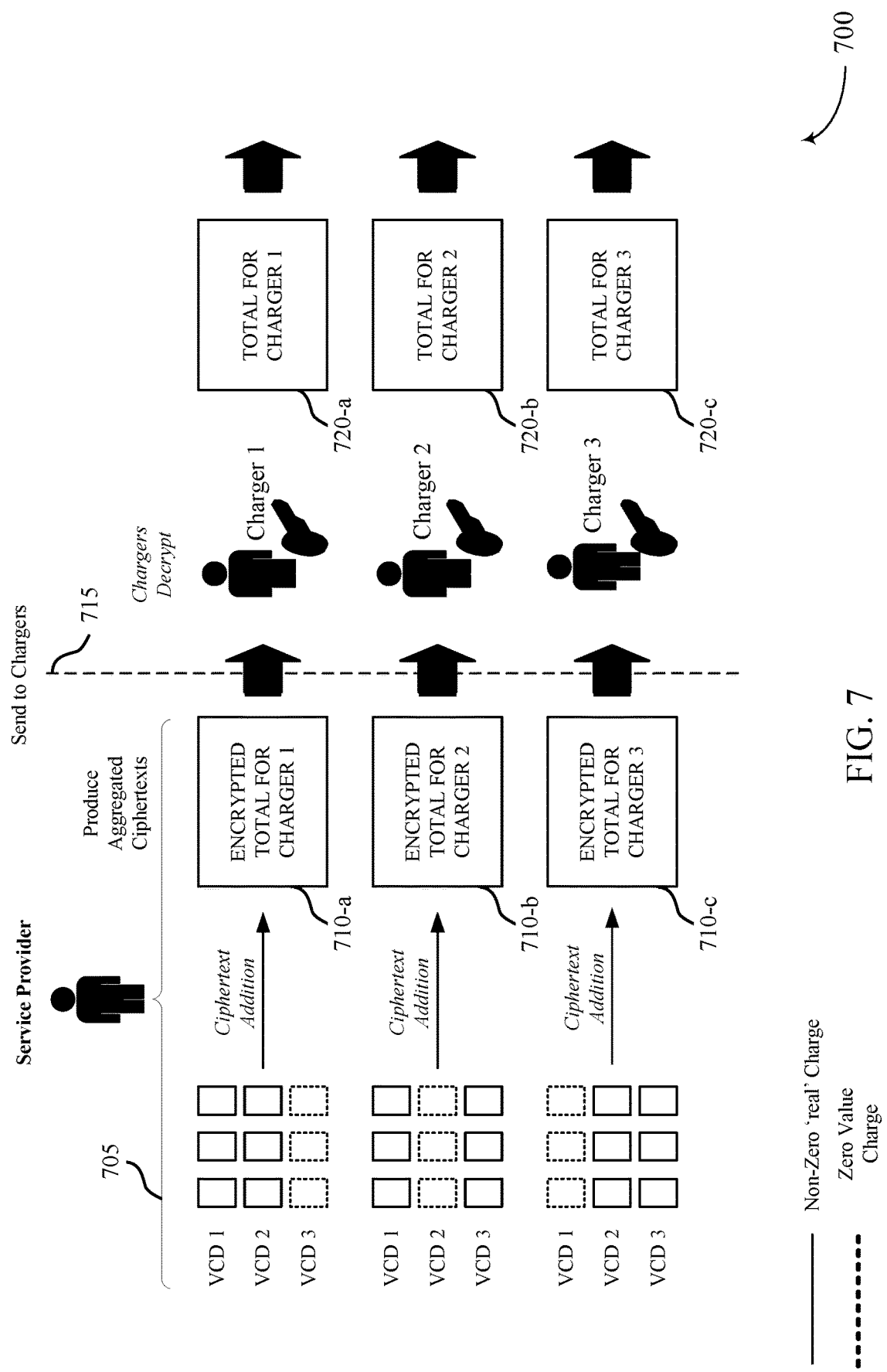

At 460, the network entity 410 may sum all of the encrypted charges (e.g., from all drivers) for each charger and provides a final encrypted revenue calculation for a billing period (e.g., as illustrated in FIG. 7, discussed below). In some case, a billing period is assumed to be pre-established between each charger and its associated service providers. The aggregated, encrypted sum of all charges is provided to the charger who has the associated decryption key. In some cases, a service provider may also provide all individually encrypted charges to the charger, which may reduce privacy. The charger may decrypt the charges to learn how much revenue it has earned in the reporting period. This may include charge quantities against a given charge policy and its associated attributes (e.g., total charges for a given vehicle type at a given bridge in a given reporting period). In some cases, the association of the individual to the non-bogus, decrypted charges is not available to the service provider or charger. The ability to make this association may be further reduced by the service provider not providing the individual encryption charges to the charger and instead providing only the encrypted sum of the charges.

At 465, optionally, the network entity 410 may perform additional auditing processes. For example, the network entity 410 may compare hashes of plaintext or encrypted charge computations on the VCD with encrypted values in an account manager. These audits may be associated to specific invoices to improve the assurance of collected data, computations and generated reports.

Such techniques may rely on the trustworthiness of the charger to truthfully report the total charges (e.g., revenue) post-decryption. For example:
1. Vehicles know the total number of chargers and their respective public keys.
2. Vehicle 1 ($V_1$) drove on roads operated by charger 1 ($c_1$), charger 3 ($c_3$). $c_1$=$5, $c_2$=$0, $c_3$=$30, $c_4$=$0
3. Vehicle 2 ($V_2$) drove on roads operated by $c_1$, $c_2$, $c_4$.
4. $V_1$ generates vector totalChargev$_1$={enc($c_1$), enc($c_2$), enc($c_3$), enc($c_4$)}
5. $V_2$ does the same
6. Service provider (SP) receives totalChargev$_1$, totalChargev$_2$
7. When the service provider needs to send the money to each charger, it adds up the individual encrypted charges, e.g., totalChargeForC1=enc($c_1$)v$_1$+enc($c_1$)v$_2$. But at this point the service provider does not know how much to pay the chargers because it is not able to decrypt totalChargeForC1. So $C_1$ will decrypt it and inform service provider.

However, $C_1$ may not report accurate numbers, and could potentially cheat to obtain additional revenue. In some cases, to mitigate cheating chargers, symmetric encryption may be used, in which the service provider can ask both the vehicle and the charger to decrypt the total charge and simply compare their responses. If the responses match, the total charge is accepted. In other cases, cheating mitigation may use zero knowledge proofs, in which the service provider can ask for proof that the decrypted value is in fact correct. In other cases, use of a trusted third entity may be implemented for performing comparisons in a trusted execution, cloud-based system.

In accordance with such techniques, by providing the indicated privacy protections, the driving public's privacy concerns can be assuaged, and impediments removed for regulatory adoption of RUC systems. Furthermore, trusted as well as privacy-preserved RUC enables congestion-based 'Local RUC' models to be adopted to replace existing tolling models and expensive Tolling infrastructure.

Figure 5:
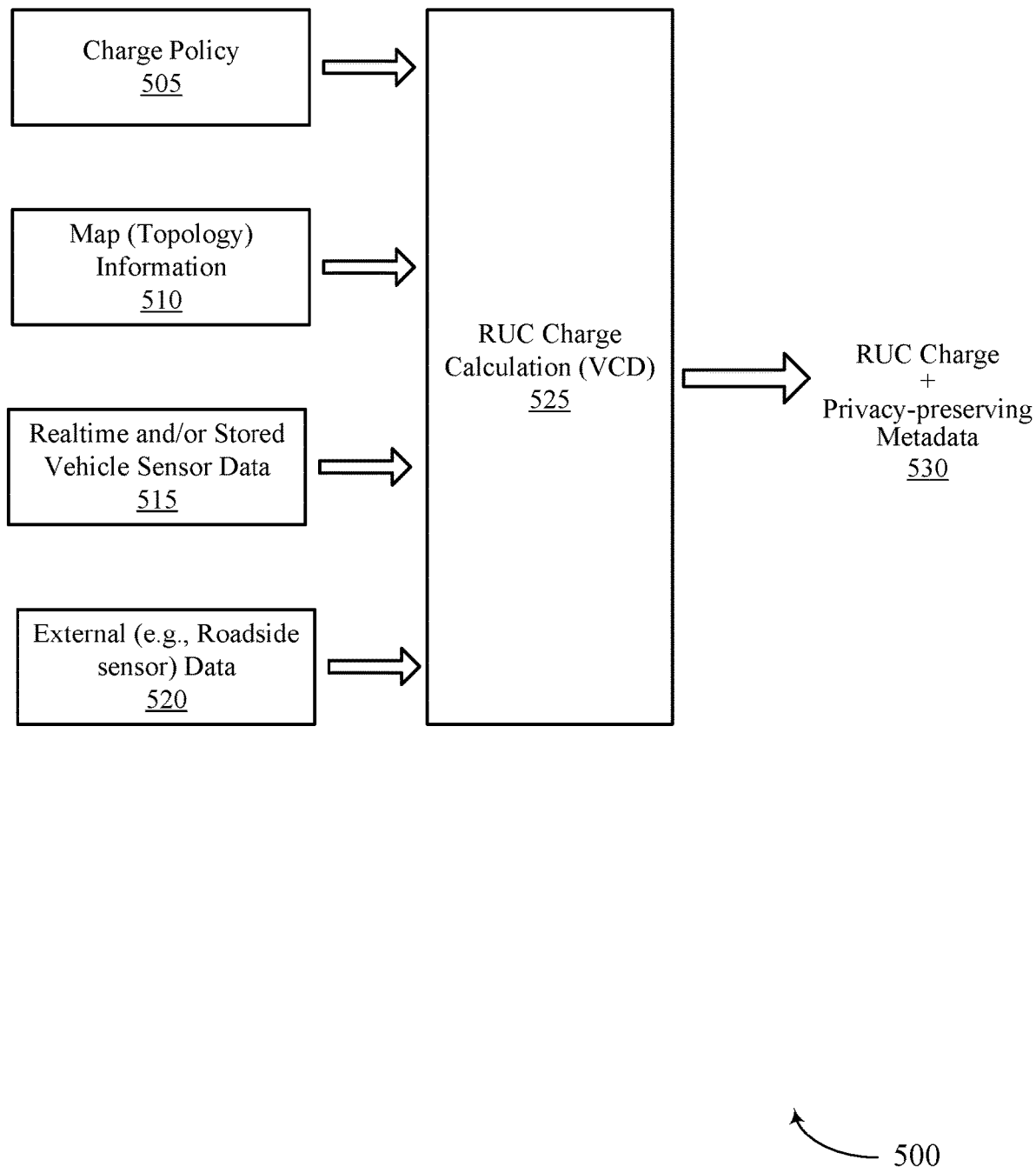
FIG. 5 illustrates an example of a RUC charge calculation inputs that support RUC determination and reporting techniques in accordance with one or more aspects of the present disclosure.

FIG. 5 illustrates an example of a RUC charge calculation inputs 500 that supports RUC determination and reporting techniques in accordance with one or more aspects of the present disclosure. RUC charge calculation inputs 500 may use wireless communications for obtaining RUC inputs, and for reporting RUC information via wireless communications system as discussed with reference to FIG. 1, for example. In the example of FIG. 5, a VCD (e.g., a VCD 195 or 405 as discussed herein) receive a number of inputs that are provided to a RUC charge calculation function 525, to generate a RUC charge and privacy-preserving metadata 530.

As discussed herein, the vehicle VCD uses one or more charge policies, and each charge policy 505 may be received from a service provider or charger. In some existing systems, charge policies may be stored at the service provider in order to centrally compute a RUC charge based on collected distance traveled and location data, and thus a vehicle (e.g., VCD) has no means by which to compute a RUC charge. In some cases, the charge policy 505 (or multiple charge policies) may be generated by either a service provider or charger, distributed to the vehicle VCD, and contain sufficient information by which to compute a charge. In some cases, the service provider may distribute an authenticated charge policy to the vehicle VCD so the vehicle may perform the charge calculation itself. In some cases, either a charger or service provider may generate and digitally sign the charge policy. In some cases, each charge policy 505 may be associated with map information 510 by which a vehicle may associate location data with charges. In some cases, the charge policy may be cryptographically verified by the vehicle VCD and its validity checked prior to being used to calculate charges. The VCD may use the charge policy 505, map information 510, along with real-time and/or stored vehicle sensor data 515 to compute the RUC charge. Additionally, in some cases the VCD may receive external sensor data 520, such as from a RSU, which may be used in the RUC calculation.

In some cases, each charge policy 505 may be distributed and updated directly to the vehicle via the service provider (e.g., via a Uu interface in a cellular communications system such as a 4G/5G system), distributed over a network (e.g., cellular Uu) by the charger, or transmitted directly in the roadside environment by the charger. In cases where a roadside communications are used, such communications may be via a PC5 interface using V2X by a RSU, using C-V2X, dedicated short range communications (DSRC) or other point-to-point communications. In some cases, charge policies may be updated and sent to the vehicle VCD as a function of the vehicle's location, charge policies may be anonymously requested by the vehicle VCD as a function of its location or planned location(s) (e.g., while trip planning), or any combinations thereof. Additionally or alternatively, charge policies may be specific to vehicle type and/or capability to provide certain inputs to the RUC charge calculation function 525. For example, if vehicle occupancy can be obtained by a vehicle's onboard sensor, this occupancy value may be used in accordance with a charge policy to affect a vehicle RUC charge. If a vehicle does not have an onboard occupancy sensor, then the charge policy may include instructions to use a default value or N/A value in the calculation. In some cases, charge policies may include instructions to obtain RUC charge calculation inputs from external data sources such as V2X RSUs.

In some cases, a charge policy may include content, instructions, or both, to be used for RUC enforcement. For example, a network entity (e.g., service provider or charger) may transmit a token, receipt, or other data value, to the vehicle indicating proof of proximity and time (e.g., as may be used in tolling systems) that the VCD uses in its RUC charge computation. Metadata generated using the token as input may be provided back to the network entity as an additional proof of a specific road usage pattern or instance.

Further, in some cases, charge policies may be specific to vehicle types or fleets. For example, police and other first responder vehicles may be given charge policies with reduced or zero charge, trucks may be given charge policies to include sensed or externally provided axle-weight values, and mass transit vehicles may be given discounted charge policies. Of course, numerous options may be used for adjusting charge policies based on desired incentives and usages, and the techniques as discussed herein may be used for any such charge policy. Using such techniques for migrating simple and complex charge policies to the vehicle allows the vehicle to be able to perform the RUC charge calculation independently of the network entity. This in turn allows the vehicle to retain and avoid output of its distance, time and location data to an external entity.

FIG. 6 illustrates an example of RUC charge encryption and communication 600 that supports RUC determination and reporting techniques in accordance with one or more aspects of the present disclosure. RUC charge encryption and communication 600 may be via a wireless communications system as discussed with reference to FIG. 1, for example. In the example of FIG. 6, a VCD 605, which may be an example of a VCD as described in FIGS. 1 through 5, may determine a number of charges according to a number of charge policies, that are reported to service provider 610.

In the example of FIG. 6, a first charger 620 may have three associated charge policies, and charges associated with each may be encrypted according to an encryption key for the first charger 620. Further, in this example, a second charger 625 may have three associated charge policies, and charges associated with each may be encrypted according to an encryption key for the second charger 625. In this example, the VCD 605 may not have any charges associated with a third charger 630, and may encrypt zero value charges (e.g., bogus or false zero-value charges) for two associated charge policies, which may be encrypted according to an encryption key for the third charger 630. The VCD 605 may also generate a VCD total charge 615, which remains unencrypted. The VCD may transmit each of the encrypted charges and the unencrypted VCD total charge to service provider 610. The service provider 610 may provide the encrypted charges of each of the first charger 620, second charger 625, and third charger 630, respectively. In some cases, each charge policy may have an associated identifier that can be used to associate charges with particular charge policies.

FIG. 7 illustrates another example of RUC charge encryption and communication 700 that supports RUC determination and reporting techniques in accordance with one or more aspects of the present disclosure. RUC charge encryption and communication 700 may be based on the example if FIG. 6. In the example of FIG. 7, a service provider 705, which may be an example of a service provider as described in FIGS. 1 through 6, may receive charges associated with different chargers from multiple different VCDs, and aggregate the charges for reporting to chargers.

In the example of FIG. 7, multiple VCDs may each transmit charges associated with one or more charge policies associated with a first charger. The service provider 705 may aggregate the charges using ciphertext addition to provide aggregated ciphertexts with an encrypted total 710-$a$ for the first charger, that are then provided at 715 to the first charger for decryption and determination of a first total charge 720-$a$ for the first charger. Likewise, the service provider 705 may aggregate the charges using ciphertext addition to provide aggregated ciphertexts with encrypted total 710-$b$ and 710-$c$ for the second charger and third charger, that are then provided for decryption and determination of a second total charge 720-$b$ for the second charger and a third total charge 720-$c$ for the third charger. Using such a technique, each charger will be unable to tie specific charges to a particular VCD, and thus privacy for each VCD is enhanced. Additionally, through the use of one or multiple false zero-charges for one or more VCDs, the particular VCD travel history is further obscured.

Figure 8:
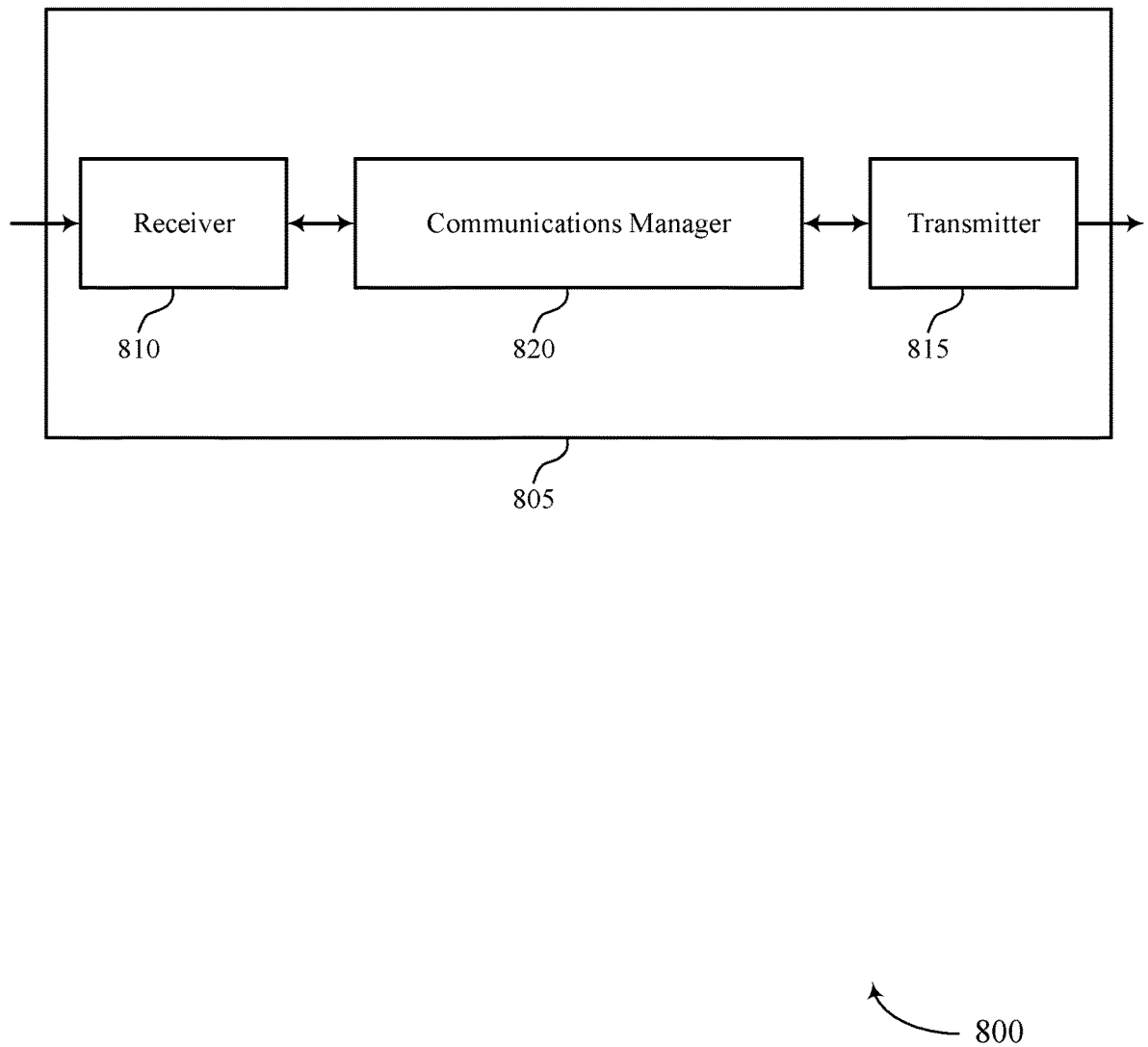
FIGS. 8 and 9 show block diagrams of devices that support RUC determination and reporting techniques in accordance with one or more aspects of the present disclosure.

FIG. 8 shows a block diagram 800 of a device 805 that supports RUC determination and reporting techniques in accordance with one or more aspects of the present disclosure. The device 805 may be an example of aspects of a VCD or a UE as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RUC determination and reporting techniques). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RUC determination and reporting techniques). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of RUC determination and reporting techniques as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support road usage charging at a VCD in accordance with examples as disclosed herein. For example, the communications manager 820 may be configured as or otherwise support a means for receiving at least a first encryption key of a first charging entity for encryption of road usage charges associated with the first charging entity. The communications manager 820 may be configured as or otherwise support a means for determining a first road usage charge associated with the first charging entity based on a first charge policy for road usage associated with the first charging entity. The communications manager 820 may be configured as or otherwise support a means for encrypting the first road usage charge based on the first encryption key to generate an encrypted first road usage charge. The communications manager 820 may be configured as or otherwise support a means for determining a total usage charge for road usage associated with the first charging entity and one or more other charging entities. The communications manager 820 may be configured as or otherwise support a means for transmitting the encrypted first road usage charge and other encrypted road usage charges in conjunction with an unencrypted total usage charge to a network entity.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for RUC determination at a vehicle that maintains privacy information for a vehicle owner/operator while also providing trustworthy and accurate RUCs for the vehicle. Such techniques may allow chargers to accurately and equitably obtain revenue based on road usage.

Figure 9:
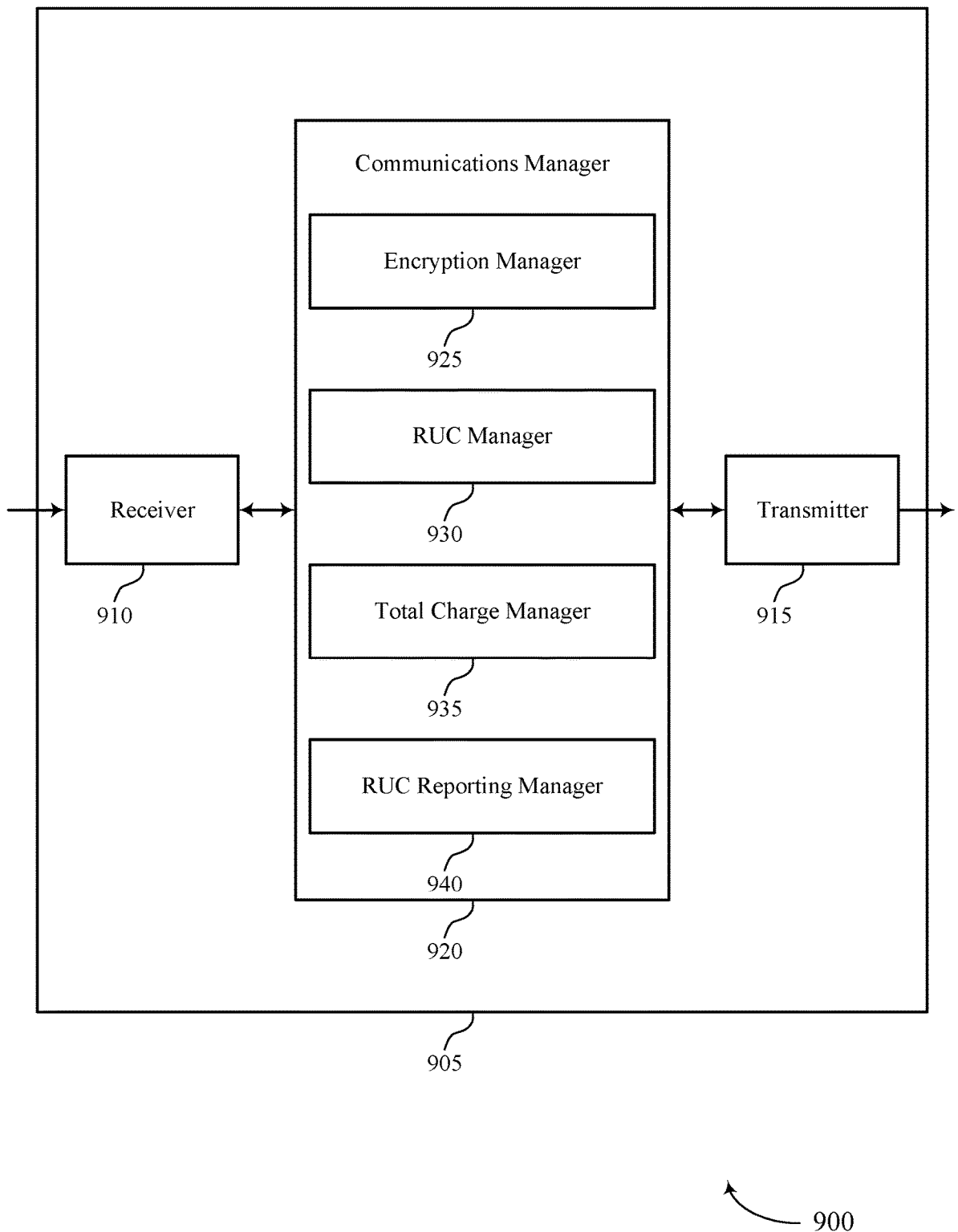

FIG. 9 shows a block diagram 900 of a device 905 that supports RUC determination and reporting techniques in accordance with one or more aspects of the present disclosure. The device 905 may be an example of aspects of a device 805, a VCD, or a UE as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to RUC determination and reporting techniques). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to RUC determination and reporting techniques). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of RUC determination and reporting techniques as described herein. For example, the communications manager 920 may include an encryption manager 925, a RUC manager 930, a total charge manager 935, a RUC reporting manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support road usage charging at a VCD in accordance with examples as disclosed herein. The encryption manager 925 may be configured as or otherwise support a means for receiving at least a first encryption key of a first charging entity for encryption of road usage charges associated with the first charging entity. The RUC manager 930 may be configured as or otherwise support a means for determining a first road usage charge associated with the first charging entity based on a first charge policy for road usage associated with the first charging entity. The encryption manager 925 may be configured as or otherwise support a means for encrypting the first road usage charge based on the first encryption key to generate an encrypted first road usage charge. The total charge manager 935 may be configured as or otherwise support a means for determining a total usage charge for road usage associated with the first charging entity and one or more other charging entities. The RUC reporting manager 940 may be configured as or otherwise support a means for transmitting the encrypted first road usage charge and other encrypted road usage charges in conjunction with an unencrypted total usage charge to a network entity.

Figure 10:
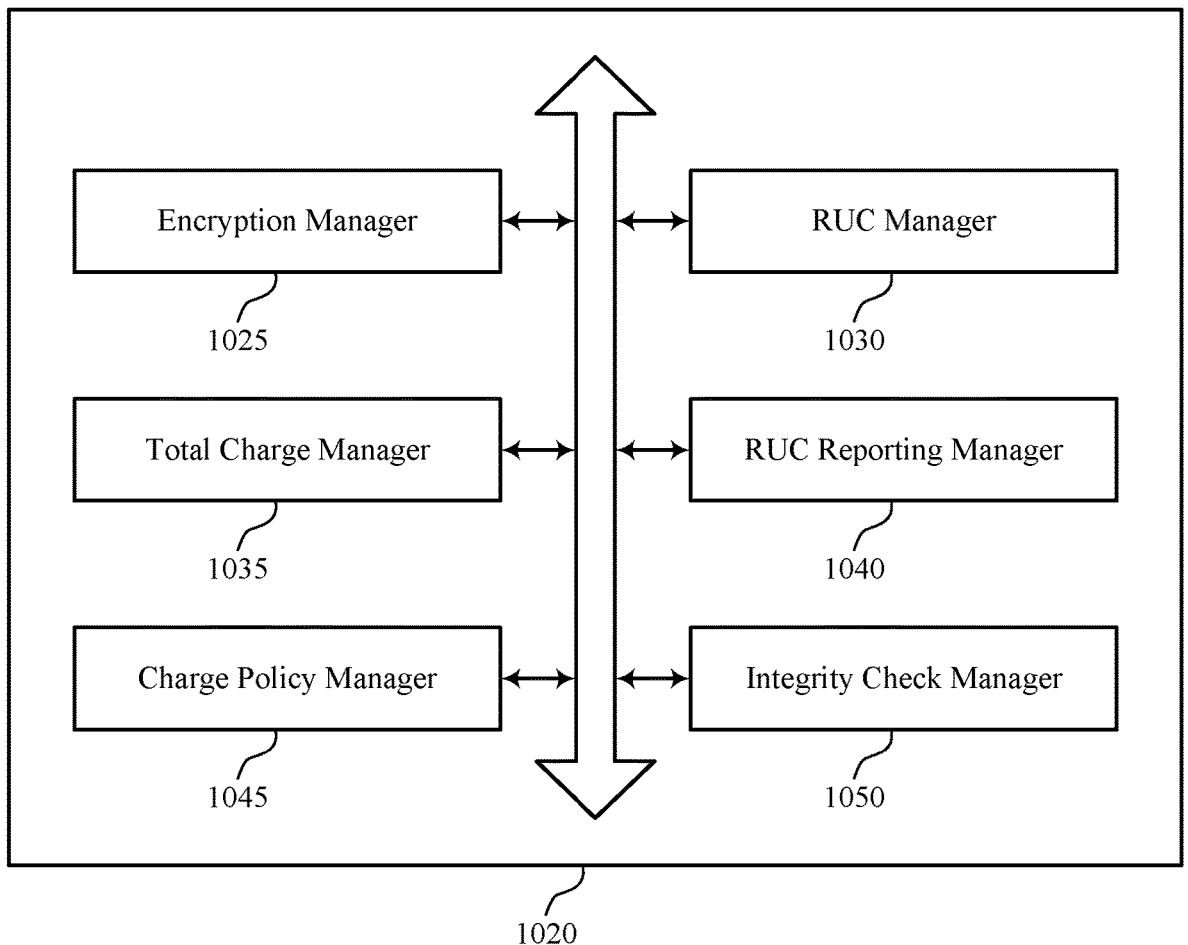
FIG. 10 shows a block diagram of a communications manager that supports RUC determination and reporting techniques in accordance with one or more aspects of the present disclosure.

FIG. 10 shows a block diagram 1000 of a communications manager 1020 that supports RUC determination and reporting techniques in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of RUC determination and reporting techniques as described herein. For example, the communications manager 1020 may include an encryption manager 1025, a RUC manager 1030, a total charge manager 1035, a RUC reporting manager 1040, a charge policy manager 1045, an integrity check manager 1050, or any combination thereof. Each of these components may communicate, directly or indirectly, with one another (e.g., via one or more buses).

The communications manager 1020 may support road usage charging at a VCD in accordance with examples as disclosed herein. The encryption manager 1025 may be configured as or otherwise support a means for receiving at least a first encryption key of a first charging entity for encryption of road usage charges associated with the first charging entity. The RUC manager 1030 may be configured as or otherwise support a means for determining a first road usage charge associated with the first charging entity based on a first charge policy for road usage associated with the first charging entity. In some examples, the encryption manager 1025 may be configured as or otherwise support a means for encrypting the first road usage charge based on the first encryption key to generate an encrypted first road usage charge. The total charge manager 1035 may be configured as or otherwise support a means for determining a total usage charge for road usage associated with the first charging entity and one or more other charging entities. The RUC reporting manager 1040 may be configured as or otherwise support a means for transmitting the encrypted first road usage charge and other encrypted road usage charges in conjunction with an unencrypted total usage charge to a network entity.

In some examples, the encryption manager 1025 may be configured as or otherwise support a means for encrypting at least a second road usage charge based on the first encryption key associated with the first charging entity or a second encryption key associated with a second charging entity to generate an encrypted second road usage charge, where the second road usage charge is either a real charge having a positive charge value or a false charge having a zero charge value. In some examples, the RUC reporting manager 1040 may be configured as or otherwise support a means for transmitting the encrypted second road usage charge along with the encrypted first road usage charge and the unencrypted total usage charge, to the network entity.

In some examples, the encrypted second road usage charge, the encrypted first road usage charge, and the unencrypted total usage charge are transmitted with an indication of a respective charging entity identification associated with each charge. In some examples, the encrypted first road usage charge includes a charge amount and one or more of an identifier or charging policy identification associated with the first road usage charge, and where the network entity generates total of ciphertext charges for a given charging policy identification such that a given charger may be informed of revenue quantities as a function of charge policy. In some examples, the first encryption key is associated with an AHE scheme, and where one or more other encryption keys are received for one or more other charging entities for reporting, using AHE, one or more other road usage charges.

In some examples, the charge policy manager 1045 may be configured as or otherwise support a means for receiving, from the first charging entity or from a service provider or network entity associated with one or more charging entities, the first charge policy associated with the first charging entity. In some examples, the integrity check manager 1050 may be configured as or otherwise support a means for receiving one or more of an attestation check or an integrity check. In some examples, the integrity check manager 1050 may be configured as or otherwise support a means for transmitting a response to one or more of the attestation check or the integrity check, and where determination of first road usage charge at the VCD is enabled based on successful completion of one or more of the attestation check or the integrity check.

In some examples, the first charge policy includes one or more parameters that enable determination of the first road usage charge at the VCD based on one or more of a location of a vehicle associated with the VCD or a time at which the vehicle was at the location. In some examples, the one or more parameters include roadway map information that enables the VCD to associate vehicle location data with the first charge policy to determine the first road usage charge.

In some examples, the charge policy manager 1045 may be configured as or otherwise support a means for cryptographically verifying that the first charge policy is valid prior to determining the first road usage charge using the first charge policy. In some examples, the charge policy manager 1045 may be configured as or otherwise support a means for receiving the first charge policy from a network entity via one or more of a cellular interface, a V2X interface, a RSU, a DSRC service, or point-to-point communication.

In some examples, the charge policy manager 1045 may be configured as or otherwise support a means for receiving one or more updates to one or more charge policies based on a location of a vehicle associated with the VCD, or based on an anonymous request from the VCD as a function of a current location or one or more planned locations of the vehicle associated with the VCD. In some examples, the first charge policy includes one or more charging parameters that are based on a vehicle type of a vehicle associated with the VCD, a capability of the VCD to provide predefined inputs to a road usage charge, or any combinations thereof.

Figure 11:
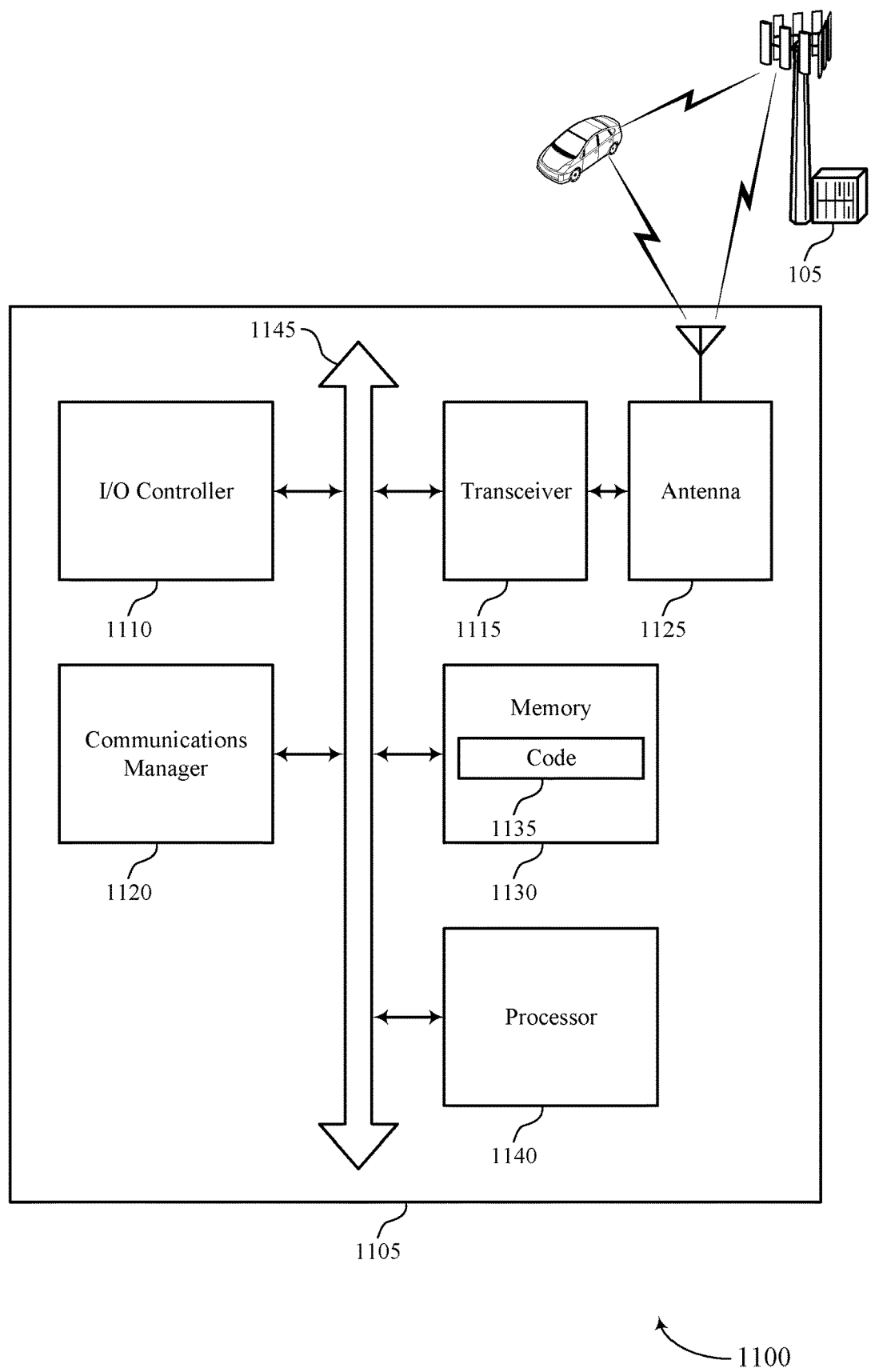
FIG. 11 shows a diagram of a system including a device that supports RUC determination and reporting techniques in accordance with one or more aspects of the present disclosure.

FIG. 11 shows a diagram of a system 1100 including a device 1105 that supports RUC determination and reporting techniques in accordance with one or more aspects of the present disclosure. The device 1105 may be an example of or include the components of a device 805, a device 905, a VCD, or a UE as described herein. The device 1105 may communicate (e.g., wirelessly) with one or more network entities 105, one or more vehicles or UEs, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting RUC determination and reporting techniques). For example, the device 1105 or a component of the device 1105 may include a processor 1140 and memory 1130 coupled with or to the processor 1140, the processor 1140 and memory 1130 configured to perform various functions described herein.

The communications manager 1120 may support road usage charging at a vehicle computing device (VCD) in accordance with examples as disclosed herein. For example, the communications manager 1120 may be configured as or otherwise support a means for receiving at least a first encryption key of a first charging entity for encryption of road usage charges associated with the first charging entity. The communications manager 1120 may be configured as or otherwise support a means for determining a first road usage charge associated with the first charging entity based on a first charge policy for road usage associated with the first charging entity. The communications manager 1120 may be configured as or otherwise support a means for encrypting the first road usage charge based on the first encryption key to generate an encrypted first road usage charge. The communications manager 1120 may be configured as or otherwise support a means for determining a total usage charge for road usage associated with the first charging entity and one or more other charging entities. The communications manager 1120 may be configured as or otherwise support a means for transmitting the encrypted first road usage charge and other encrypted road usage charges in conjunction with an unencrypted total usage charge to a network entity.

By including or configuring the communications manager 1120 in accordance with examples as described herein, the device 1105 may support techniques for RUC determination at a vehicle that maintains privacy information for a vehicle owner/operator while also providing trustworthy and accurate RUCs for the vehicle. Such techniques may allow chargers to accurately and equitably obtain revenue based on actual road usage.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of RUC determination and reporting techniques as described herein, or the processor 1140 and the memory 1130 may be otherwise configured to perform or support such operations.

Figure 12:
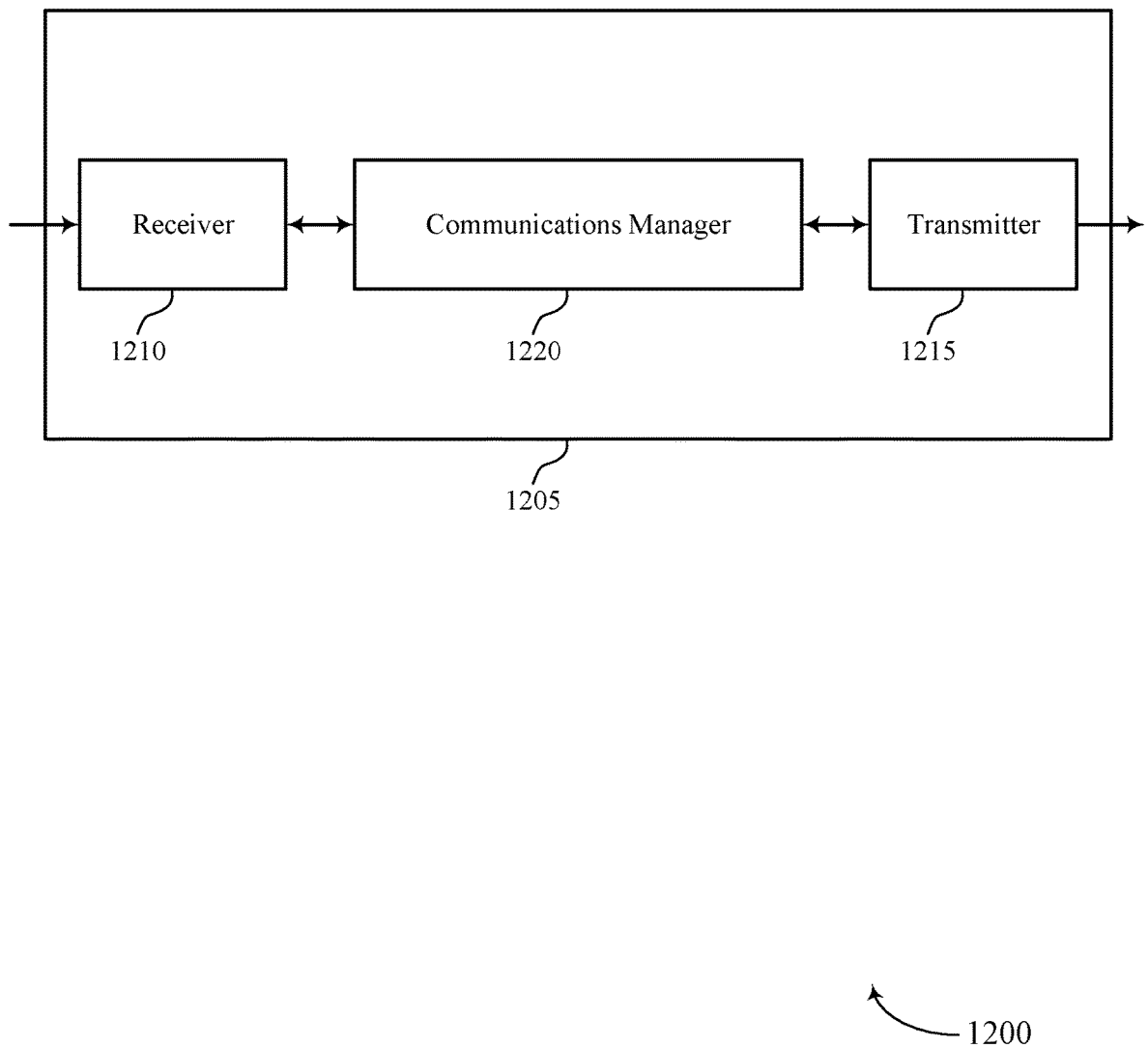
FIGS. 12 and 13 show block diagrams of devices that support RUC determination and reporting techniques in accordance with one or more aspects of the present disclosure.

FIG. 12 shows a block diagram 1200 of a device 1205 that supports RUC determination and reporting techniques in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of RUC determination and reporting techniques as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support road usage charging at a network entity in accordance with examples as disclosed herein. For example, the communications manager 1220 may be configured as or otherwise support a means for providing to one or more vehicle-associated vehicle computing devices (VCDs), at least a first encryption key of a first charging entity for encryption of one or more road usage charge associated with the first charging entity for each VCD. The communications manager 1220 may be configured as or otherwise support a means for providing to the one or more vehicle-associated VCDs, a second encryption key of a second charging entity for encryption of one or more road usage charges associated with the second charging entity for each VCD. The communications manager 1220 may be configured as or otherwise support a means for receiving a first set of encrypted road usage charges from each VCD associated with the first charging entity and a second set of encrypted road usage charges from each VCD associated with the second charging entity. The communications manager 1220 may be configured as or otherwise support a means for receiving an unencrypted total charge from each VCD that indicates a VCD-specific sum of total road usage charges for each charging entity. The communications manager 1220 may be configured as or otherwise support a means for determining a first encrypted total road usage charge for the first charging entity based on each of the first sets of encrypted road usage charges associated with the first charging entity. The communications manager 1220 may be configured as or otherwise support a means for determining a second encrypted total road usage charge for the second charging entity based on each of the second sets of encrypted road usage charges associated with the second charging entity.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for RUC determination at a vehicle that maintains privacy information for a vehicle owner/operator while also providing trustworthy and accurate RUCs for the vehicle. Such techniques may allow chargers to accurately and equitably obtain revenue based on distance traveled or other road usage charge types.

Figure 13:
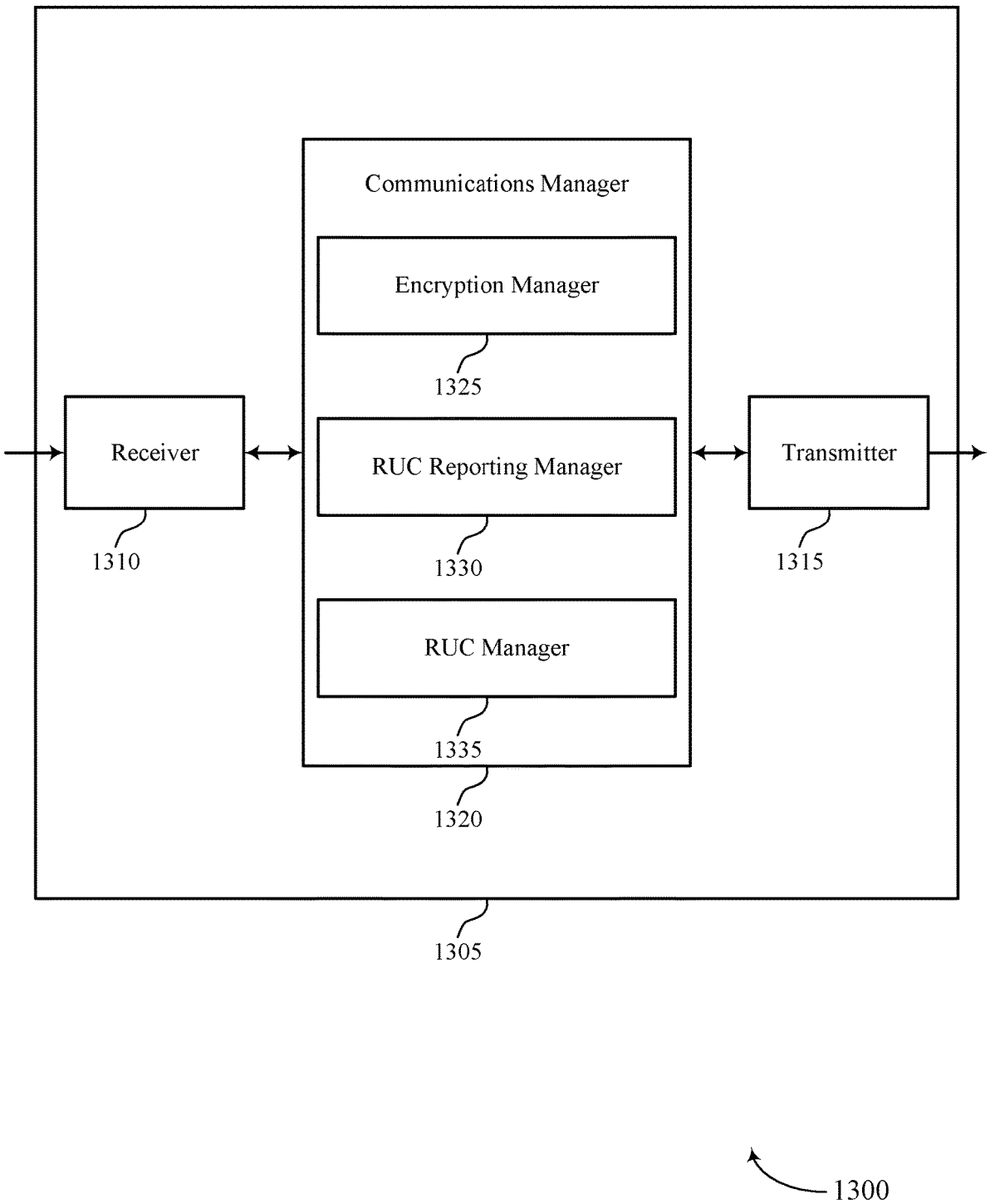

FIG. 13 shows a block diagram 1300 of a device 1305 that supports RUC determination and reporting techniques in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of RUC determination and reporting techniques as described herein. For example, the communications manager 1320 may include an encryption manager 1325, a RUC reporting manager 1330, a RUC manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support road usage charging at a network entity in accordance with examples as disclosed herein. The encryption manager 1325 may be configured as or otherwise support a means for providing to one or more vehicle-associated vehicle computing devices (VCDs), at least a first encryption key of a first charging entity for encryption of one or more road usage charge associated with the first charging entity for each VCD. The encryption manager 1325 may be configured as or otherwise support a means for providing to the one or more vehicle-associated VCDs, a second encryption key of a second charging entity for encryption of one or more road usage charges associated with the second charging entity for each VCD. The RUC reporting manager 1330 may be configured as or otherwise support a means for receiving a first set of encrypted road usage charges from each VCD associated with the first charging entity and a second set of encrypted road usage charges from each VCD associated with the second charging entity. The RUC reporting manager 1330 may be configured as or otherwise support a means for receiving an unencrypted total charge from each VCD that indicates a VCD-specific sum of total road usage charges for each charging entity. The RUC manager 1335 may be configured as or otherwise support a means for determining a first encrypted total road usage charge for the first charging entity based on each of the first sets of encrypted road usage charges associated with the first charging entity. The RUC manager 1335 may be configured as or otherwise support a means for determining a second encrypted total road usage charge for the second charging entity based on each of the second sets of encrypted road usage charges associated with the second charging entity.

Figure 14:
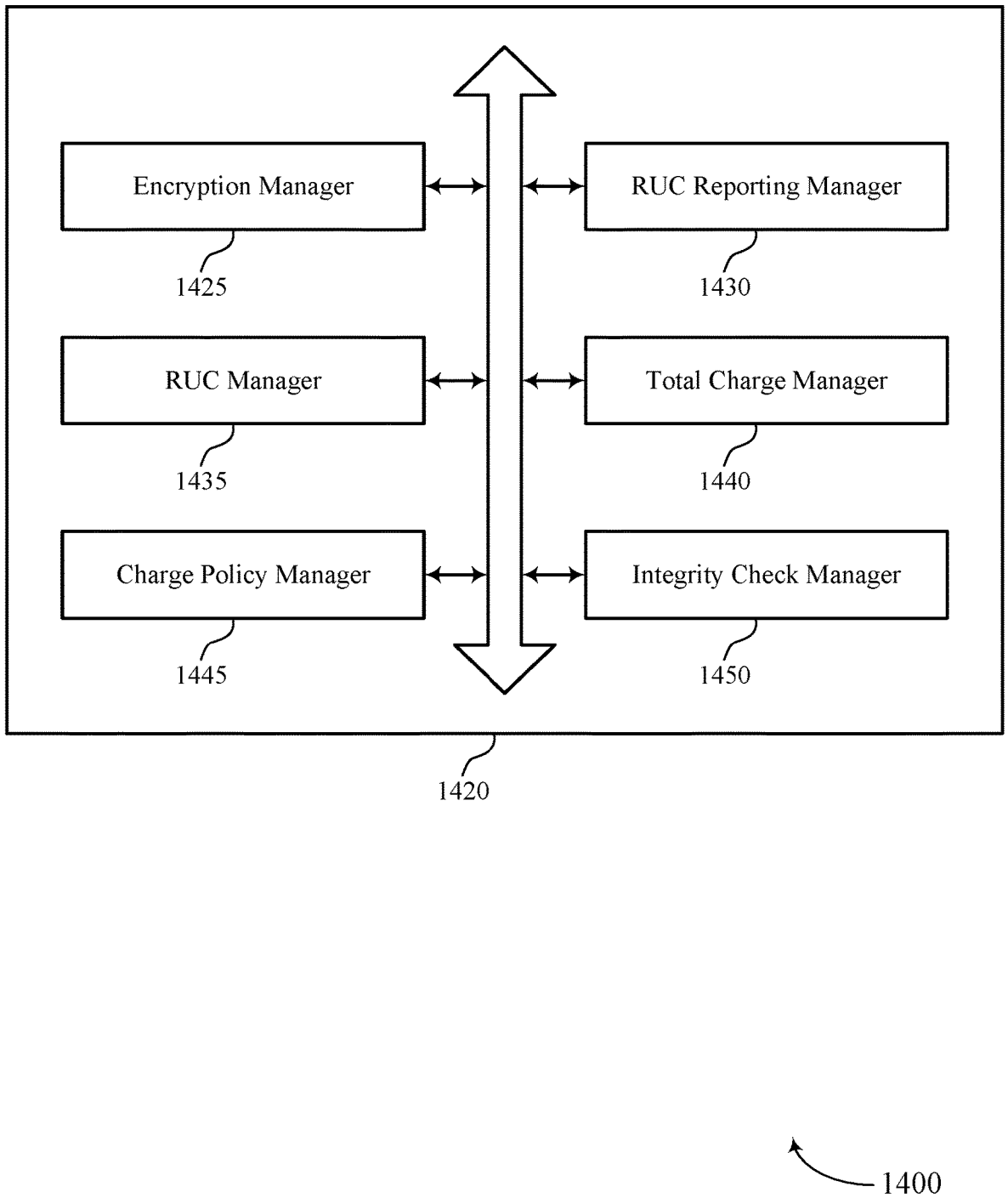
FIG. 14 shows a block diagram of a communications manager that supports RUC determination and reporting techniques in accordance with one or more aspects of the present disclosure.

FIG. 14 shows a block diagram 1400 of a communications manager 1420 that supports RUC determination and reporting techniques in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of RUC determination and reporting techniques as described herein. For example, the communications manager 1420 may include an encryption manager 1425, a RUC reporting manager 1430, a RUC manager 1435, a total charge manager 1440, a charge policy manager 1445, an integrity check manager 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support road usage charging at a network entity in accordance with examples as disclosed herein. The encryption manager 1425 may be configured as or otherwise support a means for providing to one or more vehicle-associated vehicle computing devices (VCDs), at least a first encryption key of a first charging entity for encryption of one or more road usage charge associated with the first charging entity for each VCD. In some examples, the encryption manager 1425 may be configured as or otherwise support a means for providing to the one or more vehicle-associated VCDs, a second encryption key of a second charging entity for encryption of one or more road usage charges associated with the second charging entity for each VCD. The RUC reporting manager 1430 may be configured as or otherwise support a means for receiving a first set of encrypted road usage charges from each VCD associated with the first charging entity and a second set of encrypted road usage charges from each VCD associated with the second charging entity. In some examples, the RUC reporting manager 1430 may be configured as or otherwise support a means for receiving an unencrypted total charge from each VCD that indicates a VCD-specific sum of total road usage charges for each charging entity. The RUC manager 1435 may be configured as or otherwise support a means for determining a first encrypted total road usage charge for the first charging entity based on each of the first sets of encrypted road usage charges associated with the first charging entity. In some examples, the RUC manager 1435 may be configured as or otherwise support a means for determining a second encrypted total road usage charge for the second charging entity based on each of the second sets of encrypted road usage charges associated with the second charging entity.

In some examples, one of the first set of encrypted road usage charges or the second set of encrypted road usage charges is a false charge having a zero charge value that obscures information related to specific vehicle time and usage associated with one or more charging entities. In some examples, the network entity is a service provider that relays charge information to one or more of the first charging entity or the second charging entity, or is the first charging entity. In some examples, the encrypted first encrypted total road usage charge further includes an indication of a first charge policy associated with the first charging entity that was used to compute the first encrypted total road usage charge. In some examples, the first encryption key is associated with an additively homomorphic encryption (AHE) scheme.

In some examples, the RUC reporting manager 1430 may be configured as or otherwise support a means for providing the first encrypted total road usage charge to the first charging entity, and the second encrypted total road usage charge to the second charging entity. In some examples, the RUC reporting manager 1430 may be configured as or otherwise support a means for receiving the first road usage charge and the second road usage charge from, respectively, the first charging entity and the second charging entity. In some examples, the RUC reporting manager 1430 may be configured as or otherwise support a means for verifying each of the first road usage charge and the second road usage charge based on a difference between the unencrypted total charge from the first VCD and a sum of the first road usage charge and the second road usage charge. In some examples, the total charge manager 1440 may be configured as or otherwise support a means for transmitting, to a vehicle operator associated with the VCD, a charge notice that corresponds to the sum of the total road usage charges for each charging entity. In some examples, the charge policy manager 1445 may be configured as or otherwise support a means for transmitting, to the VCD, a first charge policy associated with the first charging entity, and where the VCD computes the first set of encrypted road usage charges that is reported to the first charging entity based on the first charge policy.

In some examples, the RUC manager 1435 may be configured as or otherwise support a means for enabling assurance of correct self-reporting of at least the first set of encrypted road usage charges by the VCD based on a remote attestation check of the reporting logic, one or more integrity checks, or any combinations thereof.

In some examples, the integrity check manager 1450 may be configured as or otherwise support a means for providing, to the VCD, one or more road usage charge calculation test vectors and an indication to perform a self-test based on the charge calculation test vectors. In some examples, the integrity check manager 1450 may be configured as or otherwise support a means for receiving, from the VCD, a calculated charge determined at the VCD based on the charge calculation test vectors. In some examples, the integrity check manager 1450 may be configured as or otherwise support a means for verifying that the VCD computes an accurate calculated charge. In some examples, where the one or more parameters allow the VCD to determine pre-trip, mid-trip, or post-trip, charge discounts that may be applied to individual or total road usage charges. In some examples, the charge policy manager 1445 may be configured as or otherwise support a means for transmitting one or more updates to one or more charge policies based on a location of the vehicle associated with the VCD, based on a schedule, or based on an anonymous request from the VCD.

Figure 15:
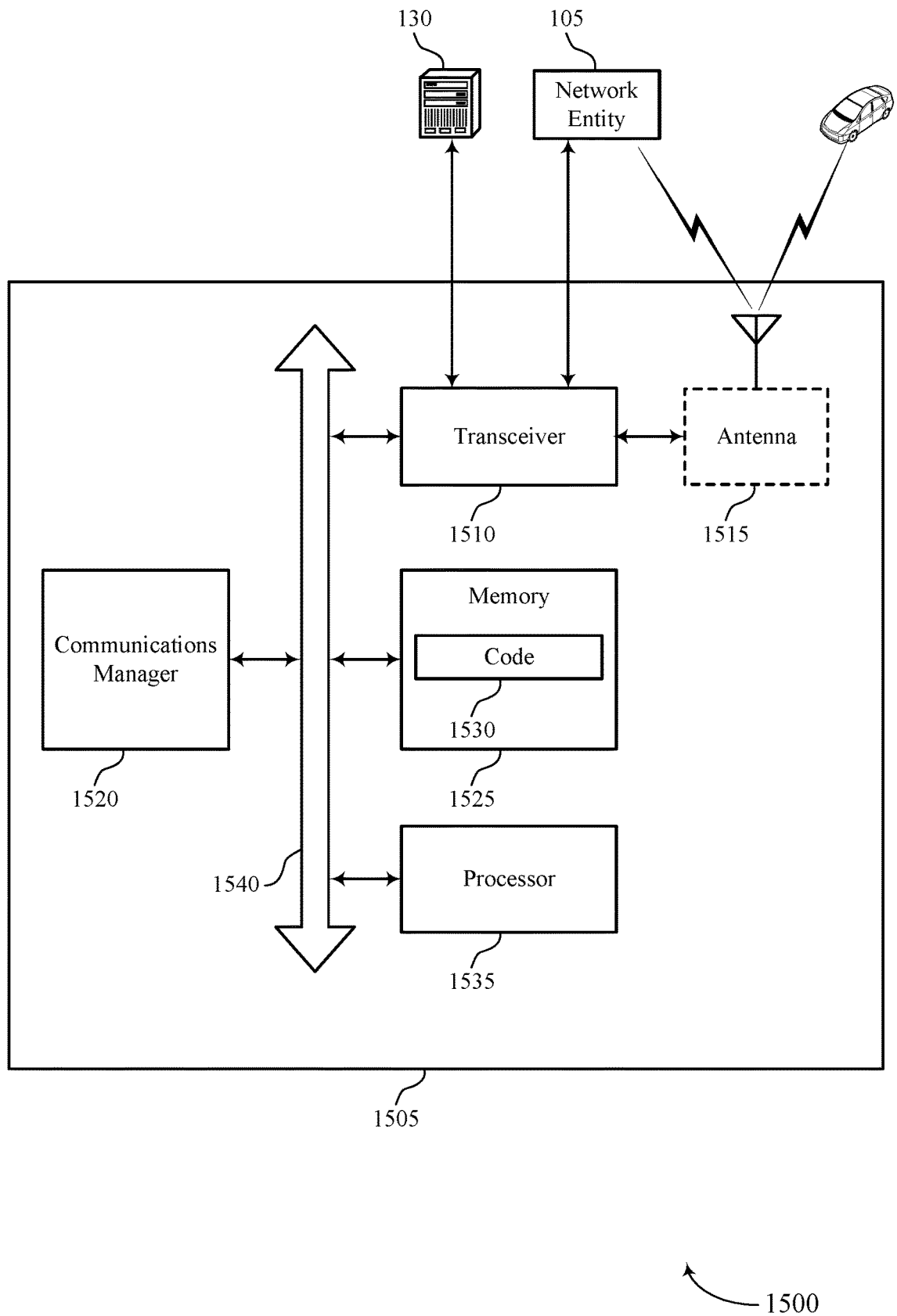
FIG. 15 shows a diagram of a system including a device that supports RUC determination and reporting techniques in accordance with one or more aspects of the present disclosure.

FIG. 15 shows a diagram of a system 1500 including a device 1505 that supports RUC determination and reporting techniques in accordance with one or more aspects of the present disclosure. The device 1505 may be an example of or include the components of a device 1205, a device 1305, or a network entity 105 as described herein. The device 1505 may communicate with one or more network entities 105, one or more vehicles or VCDs, one or more UEs, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting RUC determination and reporting techniques). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more VCDs. In some examples, the communications manager 1520 may manage communications with other network entities 105, and may include a controller or scheduler for controlling communications with VCDs in cooperation with other network entities 105. In some examples, the communications manager 1520 may support an X2 interface within an LTE/LTE-A wireless communications network technology to provide communication between network entities 105.

The communications manager 1520 may support road usage charging at a network entity in accordance with examples as disclosed herein. For example, the communications manager 1520 may be configured as or otherwise support a means for providing to one or more vehicle-associated vehicle computing devices (VCDs), at least a first encryption key of a first charging entity for encryption of one or more road usage charge associated with the first charging entity for each VCD. The communications manager 1520 may be configured as or otherwise support a means for providing to the one or more vehicle-associated VCDs, a second encryption key of a second charging entity for encryption of one or more road usage charges associated with the second charging entity for each VCD. The communications manager 1520 may be configured as or otherwise support a means for receiving a first set of encrypted road usage charges from each VCD associated with the first charging entity and a second set of encrypted road usage charges from each VCD associated with the second charging entity. The communications manager 1520 may be configured as or otherwise support a means for receiving an unencrypted total charge from each VCD that indicates a VCD-specific sum of total road usage charges for each charging entity. The communications manager 1520 may be configured as or otherwise support a means for determining a first encrypted total road usage charge for the first charging entity based on each of the first sets of encrypted road usage charges associated with the first charging entity. The communications manager 1520 may be configured as or otherwise support a means for determining a second encrypted total road usage charge for the second charging entity based on each of the second sets of encrypted road usage charges associated with the second charging entity.

By including or configuring the communications manager 1520 in accordance with examples as described herein, the device 1505 may support techniques for RUC determination at a vehicle that maintains privacy information for a vehicle owner/operator while also providing trustworthy and accurate RUCs for the vehicle. Such techniques may allow chargers to accurately and equitably obtain revenue based on road usage.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of RUC determination and reporting techniques as described herein, or the processor 1535 and the memory 1525 may be otherwise configured to perform or support such operations.

Figure 16:
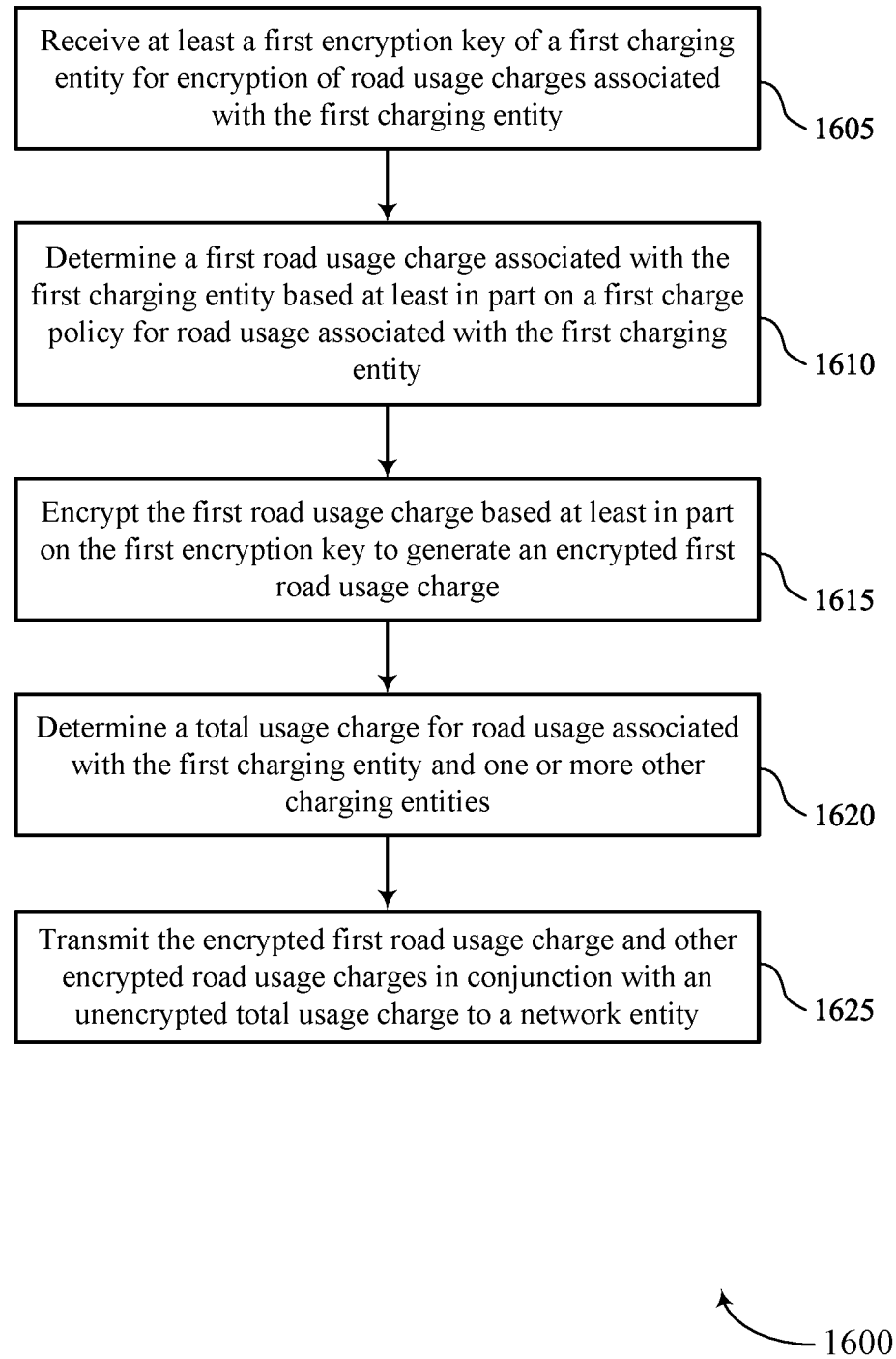
FIGS. 16 through 23 show flowcharts illustrating methods that support RUC determination and reporting techniques in accordance with one or more aspects of the present disclosure.

FIG. 16 shows a flowchart illustrating a method 1600 that supports RUC determination and reporting techniques in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving at least a first encryption key of a first charging entity for encryption of road usage charges associated with the first charging entity. The operations of 1605 may be performed in accordance with examples as disclosed herein. In some examples, aspects of the operations of 1605 may be performed by an encryption manager 1025 as described with reference to FIG. 10.

At 1610, the method may include determining a first road usage charge associated with the first charging entity based on a first charge policy for road usage associated with the first charging entity. The operations of 1610 may be performed in accordance with examples as disclosed herein. In some examples, aspects of the operations of 1610 may be performed by a RUC manager 1030 as described with reference to FIG. 10.

At 1615, the method may include encrypting the first road usage charge based on the first encryption key to generate an encrypted first road usage charge. The operations of 1615 may be performed in accordance with examples as disclosed herein. In some examples, aspects of the operations of 1615 may be performed by an encryption manager 1025 as described with reference to FIG. 10.

At 1620, the method may include determining a total usage charge for road usage associated with the first charging entity and one or more other charging entities. The operations of 1620 may be performed in accordance with examples as disclosed herein. In some examples, aspects of the operations of 1620 may be performed by a total charge manager 1035 as described with reference to FIG. 10.

At 1625, the method may include transmitting the encrypted first road usage charge and other encrypted road usage charges in conjunction with an unencrypted total usage charge to a network entity. The operations of 1625 may be performed in accordance with examples as disclosed herein. In some examples, aspects of the operations of 1625 may be performed by a RUC reporting manager 1040 as described with reference to FIG. 10.

Figure 17:
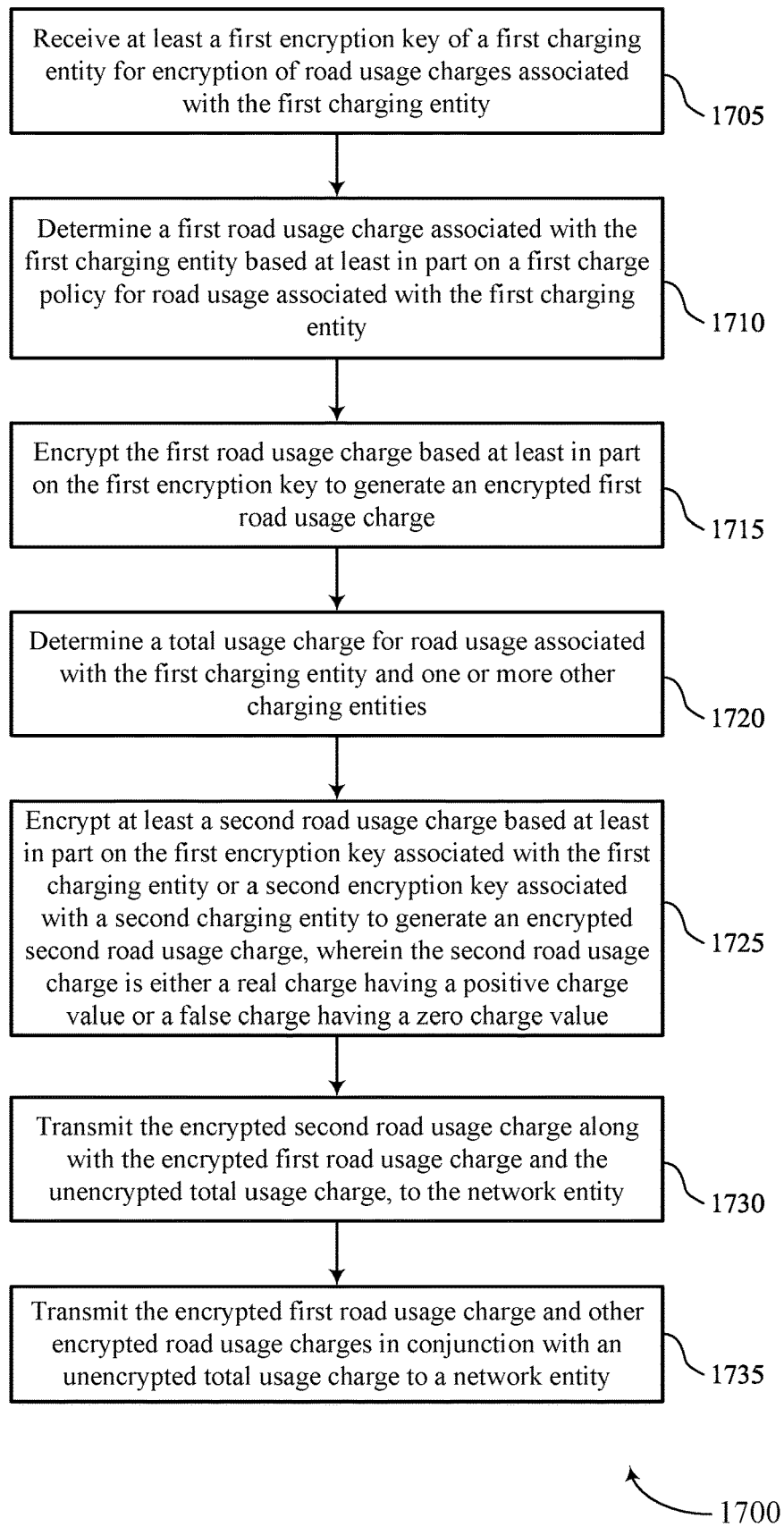

FIG. 17 shows a flowchart illustrating a method 1700 that supports RUC determination and reporting techniques in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving at least a first encryption key of a first charging entity for encryption of road usage charges associated with the first charging entity. The operations of 1705 may be performed in accordance with examples as disclosed herein. In some examples, aspects of the operations of 1705 may be performed by an encryption manager 1025 as described with reference to FIG. 10.

At 1710, the method may include determining a first road usage charge associated with the first charging entity based on a first charge policy for road usage associated with the first charging entity. The operations of 1710 may be performed in accordance with examples as disclosed herein. In some examples, aspects of the operations of 1710 may be performed by a RUC manager 1030 as described with reference to FIG. 10.

At 1715, the method may include encrypting the first road usage charge based on the first encryption key to generate an encrypted first road usage charge. The operations of 1715 may be performed in accordance with examples as disclosed herein. In some examples, aspects of the operations of 1715 may be performed by an encryption manager 1025 as described with reference to FIG. 10.

At 1720, the method may include determining a total usage charge for road usage associated with the first charging entity and one or more other charging entities. The operations of 1720 may be performed in accordance with examples as disclosed herein. In some examples, aspects of the operations of 1720 may be performed by a total charge manager 1035 as described with reference to FIG. 10.

At 1725, the method may include encrypting at least a second road usage charge based on the first encryption key associated with the first charging entity or a second encryption key associated with a second charging entity to generate an encrypted second road usage charge, where the second road usage charge is either a real charge having a positive charge value or a false charge having a zero charge value. The operations of 1725 may be performed in accordance with examples as disclosed herein. In some examples, aspects of the operations of 1725 may be performed by an encryption manager 1025 as described with reference to FIG. 10.

At 1730, the method may include transmitting the encrypted second road usage charge along with the encrypted first road usage charge and the unencrypted total usage charge, to the network entity. The operations of 1730 may be performed in accordance with examples as disclosed herein. In some examples, aspects of the operations of 1730 may be performed by a RUC reporting manager 1040 as described with reference to FIG. 10.

At 1735, the method may include transmitting the encrypted first road usage charge and other encrypted road usage charges in conjunction with an unencrypted total usage charge to a network entity. The operations of 1735 may be performed in accordance with examples as disclosed herein. In some examples, aspects of the operations of 1735 may be performed by a RUC reporting manager 1040 as described with reference to FIG. 10.

Figure 18:
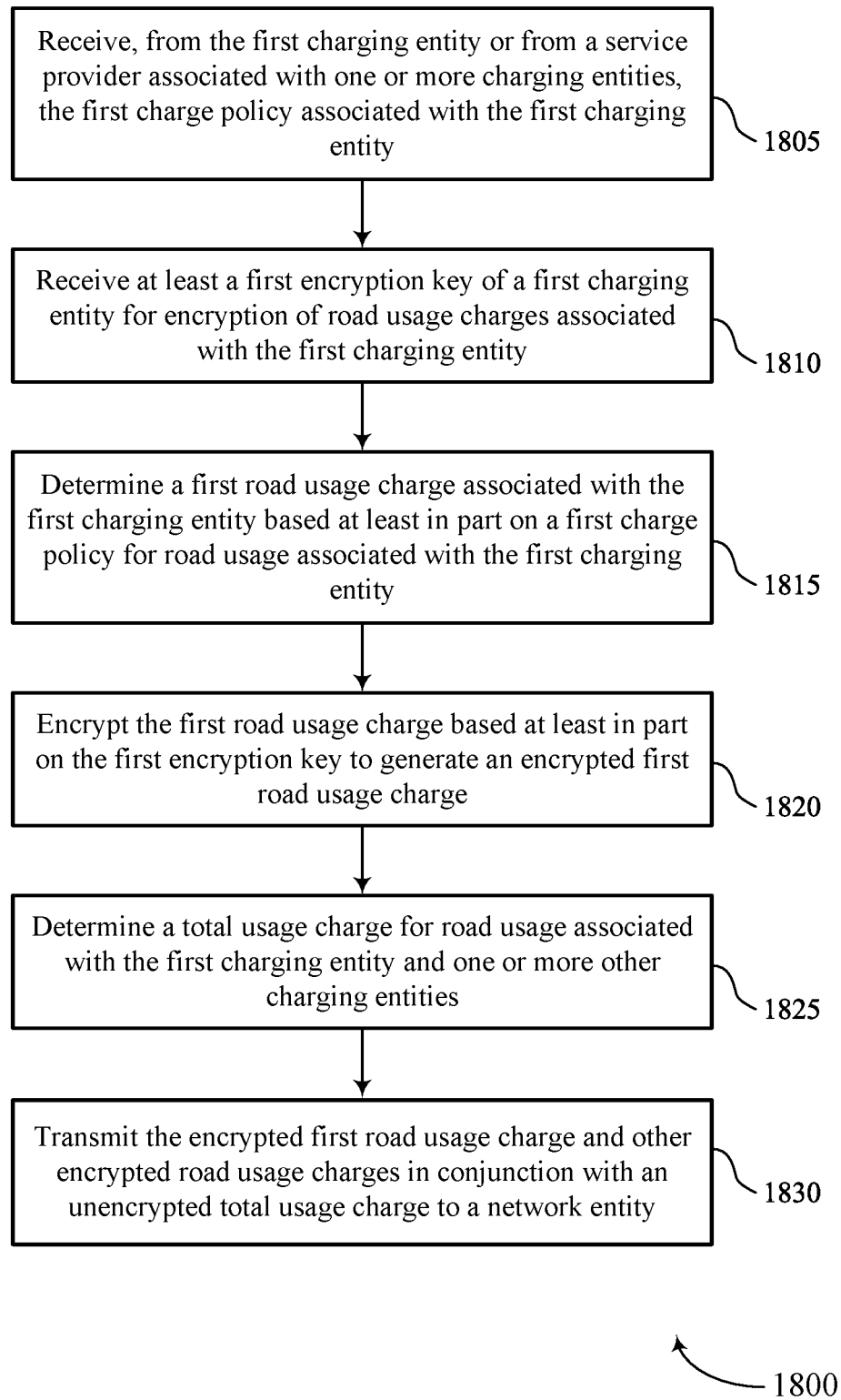

FIG. 18 shows a flowchart illustrating a method 1800 that supports RUC determination and reporting techniques in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from the first charging entity or from a service provider or network entity associated with one or more charging entities, the first charge policy associated with the first charging entity. The operations of 1805 may be performed in accordance with examples as disclosed herein. In some examples, aspects of the operations of 1805 may be performed by a charge policy manager 1045 as described with reference to FIG. 10.

At 1810, the method may include receiving at least a first encryption key of a first charging entity for encryption of road usage charges associated with the first charging entity. The operations of 1810 may be performed in accordance with examples as disclosed herein. In some examples, aspects of the operations of 1810 may be performed by an encryption manager 1025 as described with reference to FIG. 10.

At 1815, the method may include determining a first road usage charge associated with the first charging entity based on a first charge policy for road usage associated with the first charging entity. The operations of 1815 may be performed in accordance with examples as disclosed herein. In some examples, aspects of the operations of 1815 may be performed by a RUC manager 1030 as described with reference to FIG. 10.

At 1820, the method may include encrypting the first road usage charge based on the first encryption key to generate an encrypted first road usage charge. The operations of 1820 may be performed in accordance with examples as disclosed herein. In some examples, aspects of the operations of 1820 may be performed by an encryption manager 1025 as described with reference to FIG. 10.

At 1825, the method may include determining a total usage charge for road usage associated with the first charging entity and one or more other charging entities. The operations of 1825 may be performed in accordance with examples as disclosed herein. In some examples, aspects of the operations of 1825 may be performed by a total charge manager 1035 as described with reference to FIG. 10.

At 1830, the method may include transmitting the encrypted first road usage charge and other encrypted road usage charges in conjunction with an unencrypted total usage charge to a network entity. The operations of 1830 may be performed in accordance with examples as disclosed herein. In some examples, aspects of the operations of 1830 may be performed by a RUC reporting manager 1040 as described with reference to FIG. 10.

Figure 19:
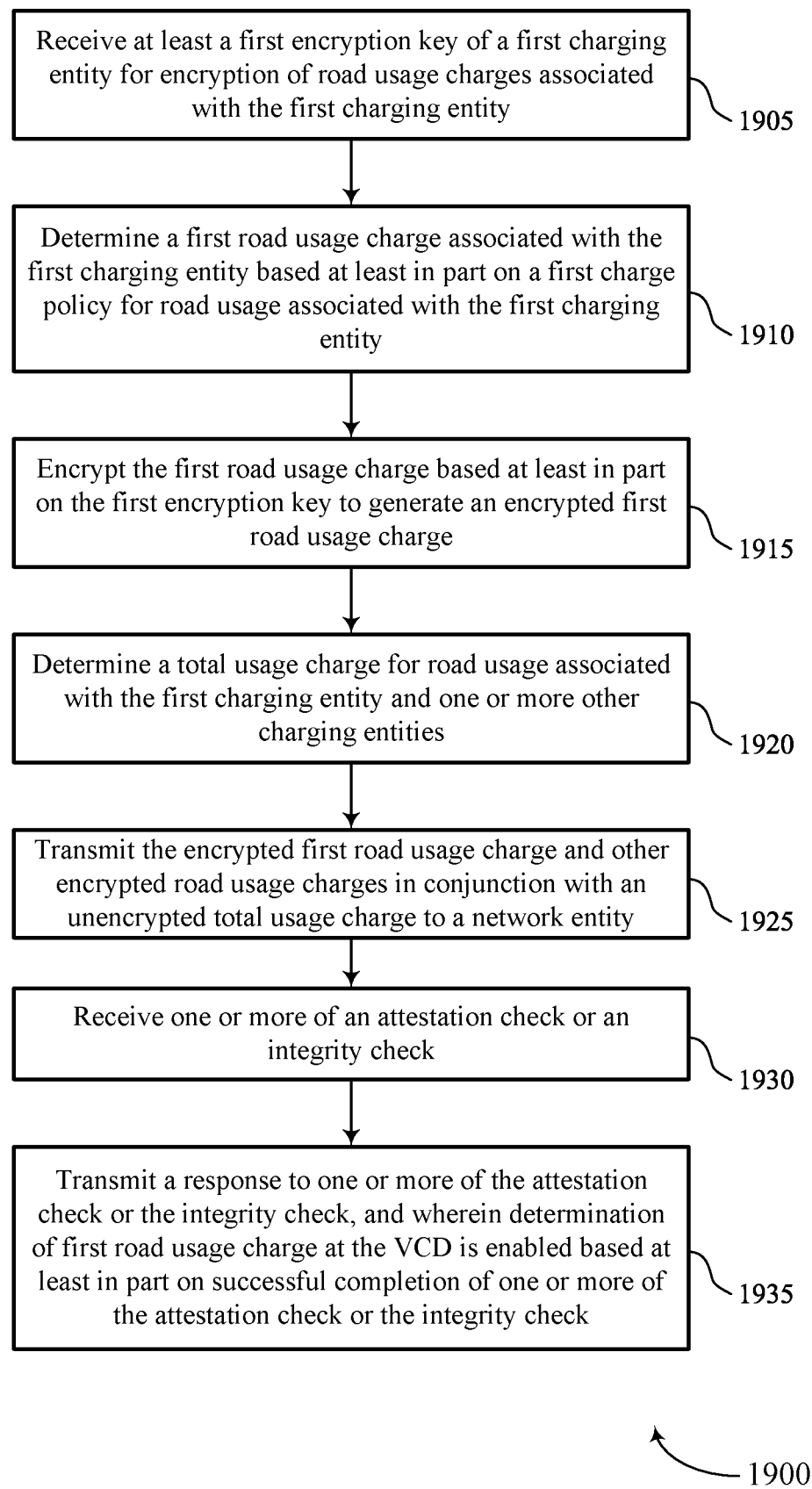

FIG. 19 shows a flowchart illustrating a method 1900 that supports RUC determination and reporting techniques in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving at least a first encryption key of a first charging entity for encryption of road usage charges associated with the first charging entity. The operations of 1905 may be performed in accordance with examples as disclosed herein. In some examples, aspects of the operations of 1905 may be performed by an encryption manager 1025 as described with reference to FIG. 10.

At 1910, the method may include determining a first road usage charge associated with the first charging entity based on a first charge policy for road usage associated with the first charging entity. The operations of 1910 may be performed in accordance with examples as disclosed herein. In some examples, aspects of the operations of 1910 may be performed by a RUC manager 1030 as described with reference to FIG. 10.

At 1915, the method may include encrypting the first road usage charge based on the first encryption key to generate an encrypted first road usage charge. The operations of 1915 may be performed in accordance with examples as disclosed herein. In some examples, aspects of the operations of 1915 may be performed by an encryption manager 1025 as described with reference to FIG. 10.

At 1920, the method may include determining a total usage charge for road usage associated with the first charging entity and one or more other charging entities. The operations of 1920 may be performed in accordance with examples as disclosed herein. In some examples, aspects of the operations of 1920 may be performed by a total charge manager 1035 as described with reference to FIG. 10.

At 1925, the method may include transmitting the encrypted first road usage charge and other encrypted road usage charges in conjunction with an unencrypted total usage charge to a network entity. The operations of 1925 may be performed in accordance with examples as disclosed herein. In some examples, aspects of the operations of 1925 may be performed by a RUC reporting manager 1040 as described with reference to FIG. 10.

At 1930, the method may include receiving one or more of an attestation check or an integrity check. The operations of 1930 may be performed in accordance with examples as disclosed herein. In some examples, aspects of the operations of 1930 may be performed by an integrity check manager 1050 as described with reference to FIG. 10.

At 1935, the method may include transmitting a response to one or more of the attestation check or the integrity check, and where determination of first road usage charge at the VCD is enabled based on successful completion of one or more of the attestation check or the integrity check. The operations of 1935 may be performed in accordance with examples as disclosed herein. In some examples, aspects of the operations of 1935 may be performed by an integrity check manager 1050 as described with reference to FIG. 10.

Figure 20:
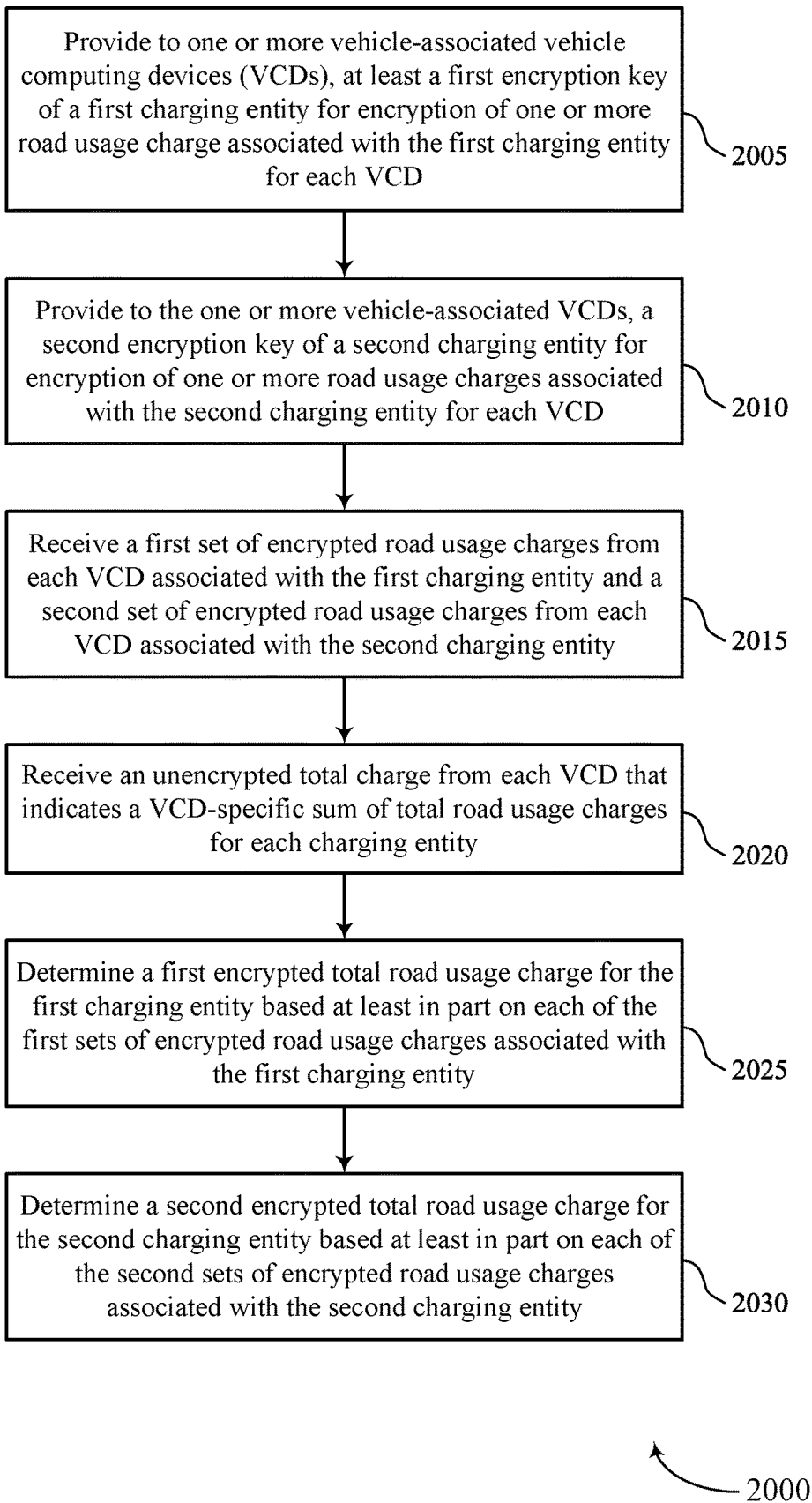

FIG. 20 shows a flowchart illustrating a method 2000 that supports RUC determination and reporting techniques in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include providing to one or more vehicle-associated vehicle computing devices (VCDs), at least a first encryption key of a first charging entity for encryption of one or more road usage charge associated with the first charging entity for each VCD. The operations of 2005 may be performed in accordance with examples as disclosed herein. In some examples, aspects of the operations of 2005 may be performed by an encryption manager 1425 as described with reference to FIG. 14.

At 2010, the method may include providing to the one or more vehicle-associated VCDs, a second encryption key of a second charging entity for encryption of one or more road usage charges associated with the second charging entity for each VCD. The operations of 2010 may be performed in accordance with examples as disclosed herein. In some examples, aspects of the operations of 2010 may be performed by an encryption manager 1425 as described with reference to FIG. 14.

At 2015, the method may include receiving a first set of encrypted road usage charges from each VCD associated with the first charging entity and a second set of encrypted road usage charges from each VCD associated with the second charging entity. The operations of 2015 may be performed in accordance with examples as disclosed herein. In some examples, aspects of the operations of 2015 may be performed by a RUC reporting manager 1430 as described with reference to FIG. 14.

At 2020, the method may include receiving an unencrypted total charge from each VCD that indicates a VCD-specific sum of total road usage charges for each charging entity. The operations of 2020 may be performed in accordance with examples as disclosed herein. In some examples, aspects of the operations of 2020 may be performed by a RUC reporting manager 1430 as described with reference to FIG. 14.

At 2025, the method may include determining a first encrypted total road usage charge for the first charging entity based on each of the first sets of encrypted road usage charges associated with the first charging entity. The operations of 2025 may be performed in accordance with examples as disclosed herein. In some examples, aspects of the operations of 2025 may be performed by a RUC manager 1435 as described with reference to FIG. 14.

At 2030, the method may include determining a second encrypted total road usage charge for the second charging entity based on each of the second sets of encrypted road usage charges associated with the second charging entity. The operations of 2030 may be performed in accordance with examples as disclosed herein. In some examples, aspects of the operations of 2030 may be performed by a RUC manager 1435 as described with reference to FIG. 14.

Figure 21:
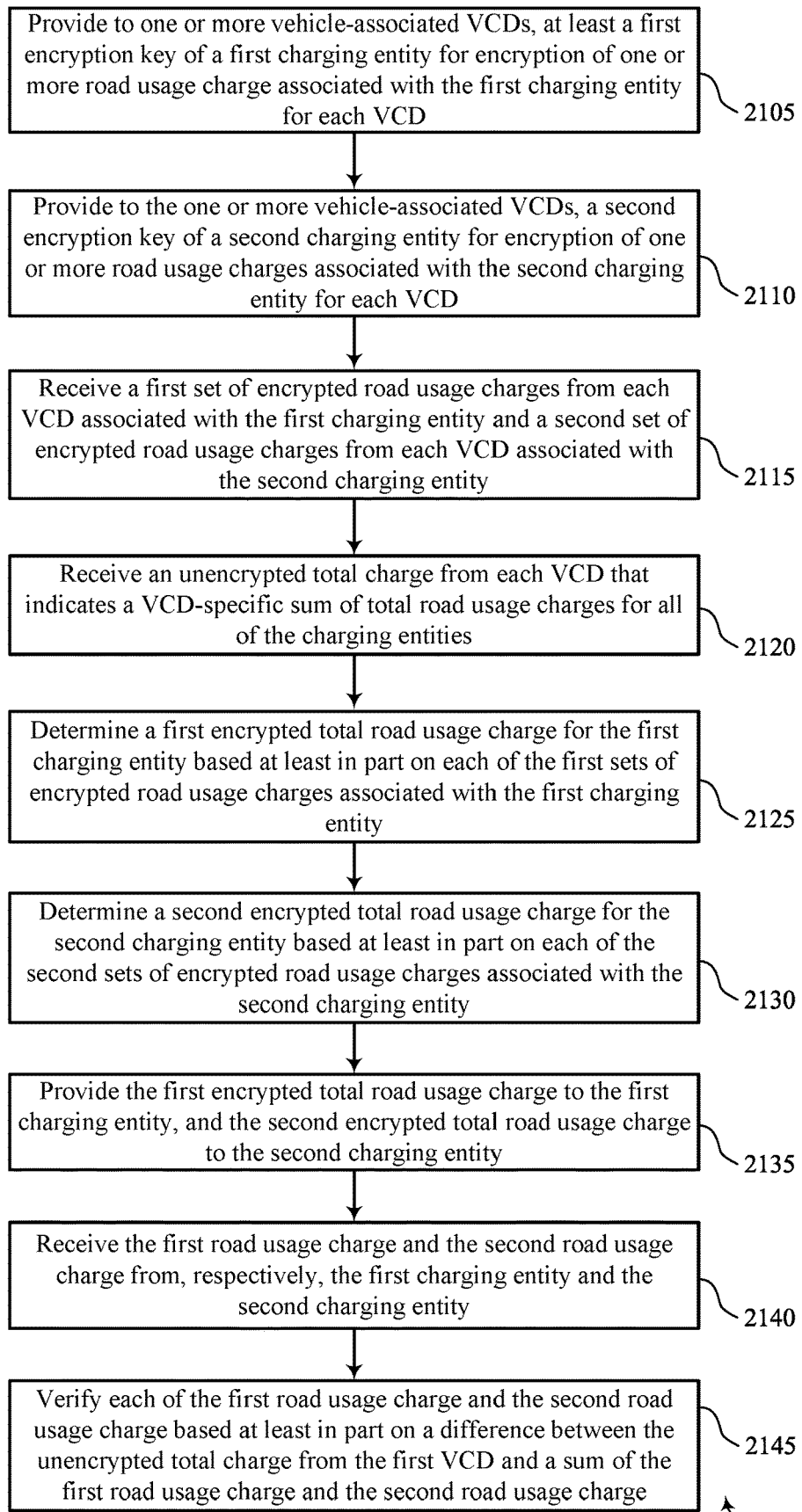

FIG. 21 shows a flowchart illustrating a method 2100 that supports RUC determination and reporting techniques in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include providing to one or more vehicle-associated vehicle computing devices (VCDs), at least a first encryption key of a first charging entity for encryption of one or more road usage charge associated with the first charging entity for each VCD. The operations of 2105 may be performed in accordance with examples as disclosed herein. In some examples, aspects of the operations of 2105 may be performed by an encryption manager 1425 as described with reference to FIG. 14.

At 2110, the method may include providing to the one or more vehicle-associated VCDs, a second encryption key of a second charging entity for encryption of one or more road usage charges associated with the second charging entity for each VCD. The operations of 2110 may be performed in accordance with examples as disclosed herein. In some examples, aspects of the operations of 2110 may be performed by an encryption manager 1425 as described with reference to FIG. 14.

At 2115, the method may include receiving a first set of encrypted road usage charges from each VCD associated with the first charging entity and a second set of encrypted road usage charges from each VCD associated with the second charging entity. The operations of 2115 may be performed in accordance with examples as disclosed herein. In some examples, aspects of the operations of 2115 may be performed by a RUC reporting manager 1430 as described with reference to FIG. 14.

At 2120, the method may include receiving an unencrypted total charge from each VCD that indicates a VCD-specific sum of total road usage charges for all of the charging entities. The operations of 2120 may be performed in accordance with examples as disclosed herein. In some examples, aspects of the operations of 2120 may be performed by a RUC reporting manager 1430 as described with reference to FIG. 14.

At 2125, the method may include determining a first encrypted total road usage charge for the first charging entity based on each of the first sets of encrypted road usage charges associated with the first charging entity. The operations of 2125 may be performed in accordance with examples as disclosed herein. In some examples, aspects of the operations of 2125 may be performed by a RUC manager 1435 as described with reference to FIG. 14.

At 2130, the method may include determining a second encrypted total road usage charge for the second charging entity based on each of the second sets of encrypted road usage charges associated with the second charging entity. The operations of 2130 may be performed in accordance with examples as disclosed herein. In some examples, aspects of the operations of 2130 may be performed by a RUC manager 1435 as described with reference to FIG. 14.

At 2135, the method may include providing the first encrypted total road usage charge to the first charging entity, and the second encrypted total road usage charge to the second charging entity. The operations of 2135 may be performed in accordance with examples as disclosed herein. In some examples, aspects of the operations of 2135 may be performed by a RUC reporting manager 1430 as described with reference to FIG. 14.

At 2140, the method may include receiving the first road usage charge and the second road usage charge from, respectively, the first charging entity and the second charging entity. The operations of 2140 may be performed in accordance with examples as disclosed herein. In some examples, aspects of the operations of 2140 may be performed by a RUC reporting manager 1430 as described with reference to FIG. 14.

At 2145, the method may include verifying each of the first road usage charge and the second road usage charge based on a difference between the unencrypted total charge from the first VCD and a sum of the first road usage charge and the second road usage charge. The operations of 2145 may be performed in accordance with examples as disclosed herein. In some examples, aspects of the operations of 2145 may be performed by a RUC reporting manager 1430 as described with reference to FIG. 14.

Figure 22:
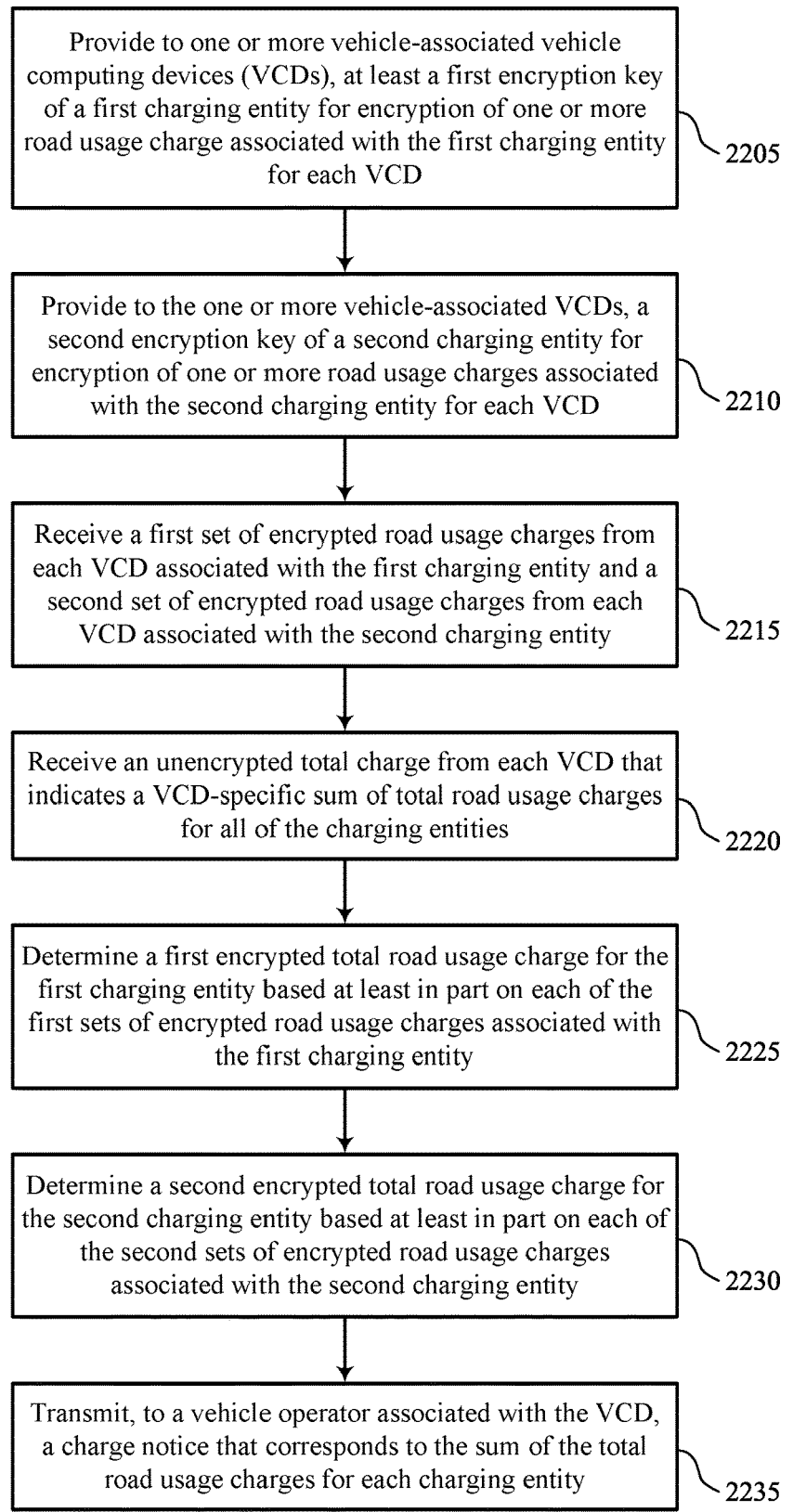

FIG. 22 shows a flowchart illustrating a method 2200 that supports RUC determination and reporting techniques in accordance with one or more aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2205, the method may include providing to one or more vehicle-associated vehicle computing devices (VCDs), at least a first encryption key of a first charging entity for encryption of one or more road usage charge associated with the first charging entity for each VCD. The operations of 2205 may be performed in accordance with examples as disclosed herein. In some examples, aspects of the operations of 2205 may be performed by an encryption manager 1425 as described with reference to FIG. 14.

At 2210, the method may include providing to the one or more vehicle-associated VCDs, a second encryption key of a second charging entity for encryption of one or more road usage charges associated with the second charging entity for each VCD. The operations of 2210 may be performed in accordance with examples as disclosed herein. In some examples, aspects of the operations of 2210 may be performed by an encryption manager 1425 as described with reference to FIG. 14.

At 2215, the method may include receiving a first set of encrypted road usage charges from each VCD associated with the first charging entity and a second set of encrypted road usage charges from each VCD associated with the second charging entity. The operations of 2215 may be performed in accordance with examples as disclosed herein. In some examples, aspects of the operations of 2215 may be performed by a RUC reporting manager 1430 as described with reference to FIG. 14.

At 2220, the method may include receiving an unencrypted total charge from each VCD that indicates a VCD-specific sum of total road usage charges for all of the charging entities. The operations of 2220 may be performed in accordance with examples as disclosed herein. In some examples, aspects of the operations of 2220 may be performed by a RUC reporting manager 1430 as described with reference to FIG. 14.

At 2225, the method may include determining a first encrypted total road usage charge for the first charging entity based on each of the first sets of encrypted road usage charges associated with the first charging entity. The operations of 2225 may be performed in accordance with examples as disclosed herein. In some examples, aspects of the operations of 2225 may be performed by a RUC manager 1435 as described with reference to FIG. 14.

At 2230, the method may include determining a second encrypted total road usage charge for the second charging entity based on each of the second sets of encrypted road usage charges associated with the second charging entity. The operations of 2230 may be performed in accordance with examples as disclosed herein. In some examples, aspects of the operations of 2230 may be performed by a RUC manager 1435 as described with reference to FIG. 14.

At 2235, the method may include transmitting, to a vehicle operator associated with the VCD, a charge notice that corresponds to the sum of the total road usage charges for each charging entity. The operations of 2235 may be performed in accordance with examples as disclosed herein. In some examples, aspects of the operations of 2235 may be performed by a total charge manager 1440 as described with reference to FIG. 14.

Figure 23:
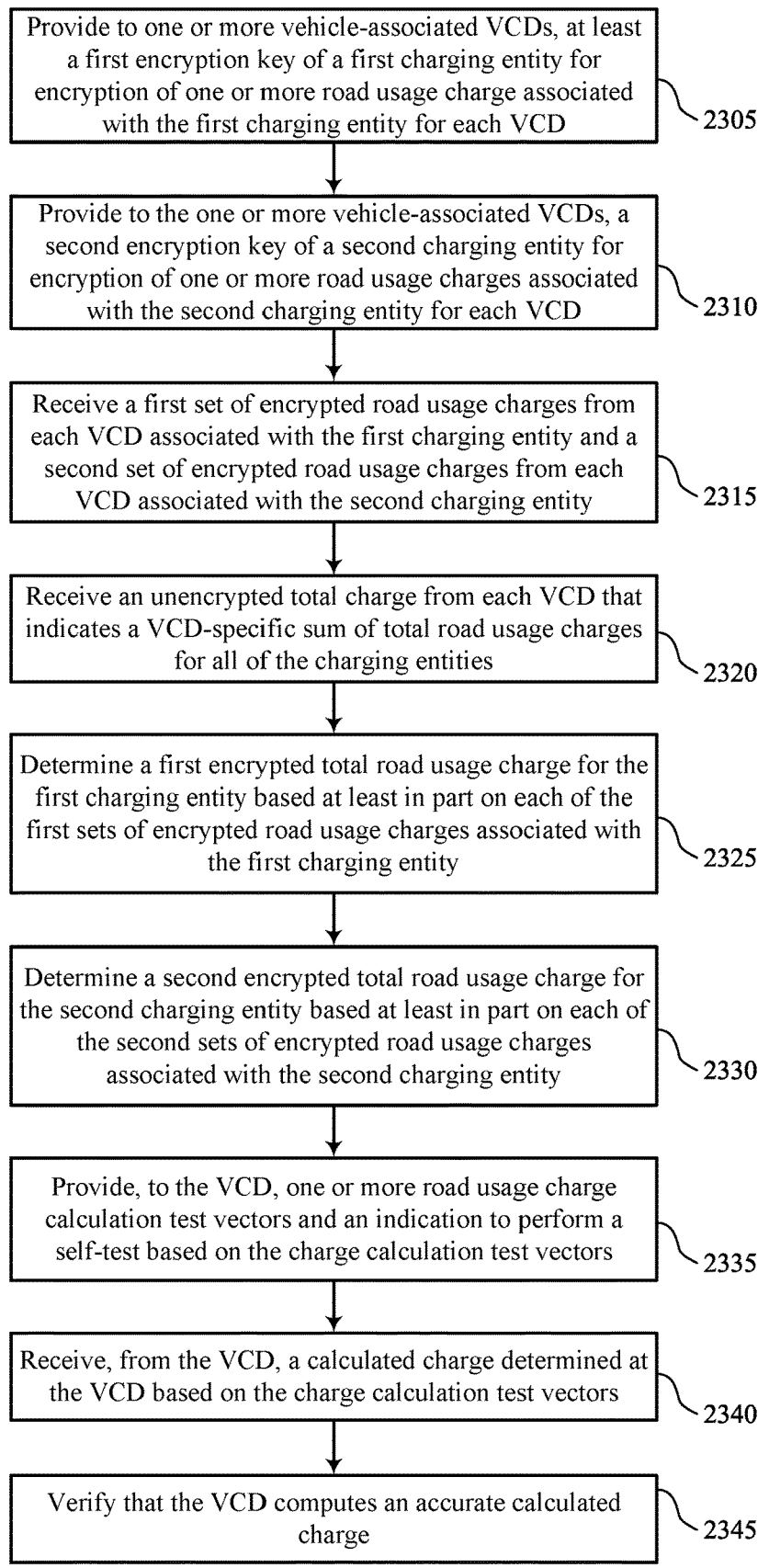

FIG. 23 shows a flowchart illustrating a method 2300 that supports RUC determination and reporting techniques in accordance with one or more aspects of the present disclosure. The operations of the method 2300 may be implemented by a UE or a network entity or its components as described herein. For example, the operations of the method 2300 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2305, the method may include providing to one or more vehicle-associated vehicle computing devices (VCDs), at least a first encryption key of a first charging entity for encryption of one or more road usage charge associated with the first charging entity for each VCD. The operations of 2305 may be performed in accordance with examples as disclosed herein. In some examples, aspects of the operations of 2305 may be performed by an encryption manager 1425 as described with reference to FIG. 14.

At 2310, the method may include providing to the one or more vehicle-associated VCDs, a second encryption key of a second charging entity for encryption of one or more road usage charges associated with the second charging entity for each VCD. The operations of 2310 may be performed in accordance with examples as disclosed herein. In some examples, aspects of the operations of 2310 may be performed by an encryption manager 1425 as described with reference to FIG. 14.

At 2315, the method may include receiving a first set of encrypted road usage charges from each VCD associated with the first charging entity and a second set of encrypted road usage charges from each VCD associated with the second charging entity. The operations of 2315 may be performed in accordance with examples as disclosed herein. In some examples, aspects of the operations of 2315 may be performed by a RUC reporting manager 1430 as described with reference to FIG. 14.

At 2320, the method may include receiving an unencrypted total charge from each VCD that indicates a VCD-specific sum of total road usage charges for all of the charging entities. The operations of 2320 may be performed in accordance with examples as disclosed herein. In some examples, aspects of the operations of 2320 may be performed by a RUC reporting manager 1430 as described with reference to FIG. 14.

At 2325, the method may include determining a first encrypted total road usage charge for the first charging entity based on each of the first sets of encrypted road usage charges associated with the first charging entity. The operations of 2325 may be performed in accordance with examples as disclosed herein. In some examples, aspects of the operations of 2325 may be performed by a RUC manager 1435 as described with reference to FIG. 14.

At 2330, the method may include determining a second encrypted total road usage charge for the second charging entity based on each of the second sets of encrypted road usage charges associated with the second charging entity. The operations of 2330 may be performed in accordance with examples as disclosed herein. In some examples, aspects of the operations of 2330 may be performed by a RUC manager 1435 as described with reference to FIG. 14.

At 2335, the method may include providing, to the VCD, one or more road usage charge calculation test vectors and an indication to perform a self-test based on the charge calculation test vectors. The operations of 2335 may be performed in accordance with examples as disclosed herein. In some examples, aspects of the operations of 2335 may be performed by an integrity check manager 1450 as described with reference to FIG. 14.

At 2340, the method may include receiving, from the VCD, a calculated charge determined at the VCD based on the charge calculation test vectors. The operations of 2340 may be performed in accordance with examples as disclosed herein. In some examples, aspects of the operations of 2340 may be performed by an integrity check manager 1450 as described with reference to FIG. 14.

At 2345, the method may include verifying that the VCD computes an accurate calculated charge. The operations of 2345 may be performed in accordance with examples as disclosed herein. In some examples, aspects of the operations of 2345 may be performed by an integrity check manager 1450 as described with reference to FIG. 14.

The following provides an overview of aspects of the present disclosure:

Aspect 1: A method for road usage charging at a vehicle computing device (VCD), comprising: receiving at least a first encryption key of a first charging entity for encryption of road usage charges associated with the first charging entity; determining a first road usage charge associated with the first charging entity based at least in part on a first charge policy for road usage associated with the first charging entity; encrypting the first road usage charge based at least in part on the first encryption key to generate an encrypted first road usage charge; determining a total usage charge for road usage associated with the first charging entity and one or more other charging entities; and transmitting the encrypted first road usage charge and other encrypted road usage charges in conjunction with an unencrypted total usage charge to a network entity.

Aspect 2: The method of aspect 1, further comprising: encrypting at least a second road usage charge based at least in part on the first encryption key associated with the first charging entity or a second encryption key associated with a second charging entity to generate an encrypted second road usage charge, wherein the second road usage charge is either a real charge having a positive charge value or a false charge having a zero charge value; and transmitting the encrypted second road usage charge along with the encrypted first road usage charge and the unencrypted total usage charge, to the network entity.

Aspect 3: The method of aspect 2, wherein the encrypted second road usage charge, the encrypted first road usage charge, and the unencrypted total usage charge are transmitted with an indication of a respective charging entity identification associated with each charge.

Aspect 4: The method of any of aspects 1 through 3, wherein the encrypted first road usage charge includes a charge amount and one or more of an identifier or charging policy identification associated with the first road usage charge, and the network entity generates total of ciphertext charges for a given charging policy identification such that a given charger may be informed of revenue quantities as a function of charge policy.

Aspect 5: The method of any of aspects 1 through 4, wherein the first encryption key is associated with an additively homomorphic encryption (AHE) scheme, and one or more other encryption keys are received for one or more other charging entities for reporting, using AHE, one or more other road usage charges.

Aspect 6: The method of any of aspects 1 through 5, further comprising: receiving, from the first charging entity or from a service provider or network entity associated with one or more charging entities, the first charge policy associated with the first charging entity.

Aspect 7: The method of any of aspects 1 through 6, further comprising: receiving one or more of an attestation check or an integrity check; and transmitting a response to one or more of the attestation check or the integrity check, and wherein determination of first road usage charge at the VCD is enabled based at least in part on successful completion of one or more of the attestation check or the integrity check.

Aspect 8: The method of any of aspects 1 through 7, wherein the first charge policy includes one or more parameters that enable determination of the first road usage charge at the VCD based at least in part on one or more of a location of a vehicle associated with the VCD or a time at which the vehicle was at the location.

Aspect 9: The method of aspect 8, wherein the one or more parameters include roadway map information that enables the VCD to associate vehicle location data with the first charge policy to determine the first road usage charge.

Aspect 10: The method of any of aspects 8 through 9, further comprising: cryptographically verifying that the first charge policy is valid prior to determining the first road usage charge using the first charge policy.

Aspect 11: The method of any of aspects 1 through 10, further comprising: receiving the first charge policy from a network entity via one or more of a cellular interface, a vehicle-to-everything (V2X) interface, a roadside unit (RSU), a dedicated short range communications (DSRC) service, or point-to-point communication.

Aspect 12: The method of any of aspects 1 through 11, further comprising: receiving one or more updates to one or more charge policies based at least in part on a location of a vehicle associated with the VCD, or based on an anonymous request from the VCD as a function of a current location or one or more planned locations of the vehicle associated with the VCD.

Aspect 13: The method of any of aspects 1 through 12, wherein the first charge policy includes one or more charging parameters that are based at least in part on a vehicle type of a vehicle associated with the VCD, a capability of the VCD to provide predefined inputs to a road usage charge according to the first charge policy, or any combinations thereof.

Aspect 14: A method for road usage charging at a network entity, comprising: providing to one or more vehicle-associated vehicle computing devices (VCDs), at least a first encryption key of a first charging entity for encryption of one or more road usage charge associated with the first charging entity for each VCD; providing to the one or more vehicle-associated VCDs, a second encryption key of a second charging entity for encryption of one or more road usage charges associated with the second charging entity for each VCD; receiving a first set of encrypted road usage charges from each VCD associated with the first charging entity and a second set of encrypted road usage charges from each VCD associated with the second charging entity; receiving an unencrypted total charge from each VCD that indicates a VCD-specific sum of total road usage charges for all of the charging entities; determining a first encrypted total road usage charge for the first charging entity based at least in part on each of the first sets of encrypted road usage charges associated with the first charging entity; and determining a second encrypted total road usage charge for the second charging entity based at least in part on each of the second sets of encrypted road usage charges associated with the second charging entity.

Aspect 15: The method of aspect 14, wherein one of the first set of encrypted road usage charges or the second set of encrypted road usage charges is a false charge having a zero charge value that obscures information related to specific vehicle time and usage associated with one or more charging entities or associated charge policies.

Aspect 16: The method of any of aspects 14 through 15, wherein the network entity is a service provider that relays charge information to one or more of the first charging entity or the second charging entity, or is the first charging entity.

Aspect 17: The method of any of aspects 14 through 16, wherein the encrypted first encrypted total road usage charge further includes an indication of a first charge policy associated with the first charging entity that was used to compute the first encrypted total road usage charge.

Aspect 18: The method of any of aspects 14 through 17, wherein the first encryption key is associated with an additively homomorphic encryption (AHE) scheme.

Aspect 19: The method of any of aspects 14 through 18, further comprising: providing the first encrypted total road usage charge to the first charging entity, and the second encrypted total road usage charge to the second charging entity; receiving the first road usage charge and the second road usage charge from, respectively, the first charging entity and the second charging entity; and verifying each of the first road usage charge and the second road usage charge based at least in part on a difference between the unencrypted total charge from the first VCD and a sum of the first road usage charge and the second road usage charge.

Aspect 20: The method of any of aspects 14 through 19, further comprising: transmitting, to a vehicle operator associated with the VCD, a charge notice that corresponds to the sum of the total road usage charges for each charging entity.

Aspect 21: The method of any of aspects 14 through 20, further comprising: transmitting, to the VCD, a first charge policy associated with the first charging entity, and wherein the VCD computes the first set of encrypted road usage charges that is reported to the first charging entity based at least in part on the first charge policy.

Aspect 22: The method of any of aspects 14 through 21, further comprising: enabling assurance of correct self-reporting of at least the first set of encrypted road usage charges by the VCD based at least in part on an remote attestation, one or more integrity checks, or any combinations thereof.

Aspect 23: The method of any of aspects 14 through 22, further comprising: providing, to the VCD, one or more road usage charge calculation test vectors and an indication to perform a self-test based on the charge calculation test vectors; receiving, from the VCD, a calculated charge determined at the VCD based on the charge calculation test vectors; and verifying that the VCD computes an accurate calculated charge.

Aspect 24: The method of any of aspects 14 through 23, wherein a first charge policy includes one or more parameters that enable determination of the first set of encrypted road usage charges at the VCD based at least in part on one or more of a location of a vehicle associated with the VCD, a time at which the vehicle was at the location, one or more road usage charge discounting policies, or any combinations thereof, and wherein the one or more parameters allow the VCD to determine pre-trip, mid-trip, or post-trip, charge discounts that may be applied to individual or total road usage charges Aspect 25: The method of any of aspects 14 through 24, further comprising: transmitting one or more updates to one or more charge policies based at least in part on a location of the vehicle associated with the VCD, a schedule, or based on an anonymous request from the VCD.

Aspect 26: An apparatus for road usage charging at a vehicle computing device (VCD), comprising a processor; memory coupled with the processor; and instructions stored in the memory and executable by the processor to cause the apparatus to perform a method of any of aspects 1 through 13.

Aspect 27: An apparatus for road usage charging at a vehicle computing device (VCD), comprising at least one means for performing a method of any of aspects 1 through 13.

Aspect 28: A non-transitory computer-readable medium storing code for road usage charging at a vehicle computing device (VCD), the code comprising instructions executable by a processor to perform a method of any of aspects 1 through 13.

Aspect 29: An apparatus for road usage charging at a network entity, comprising a processor; memory coupled with the processor; and instructions stored in the memory and executable by the processor to cause the apparatus to perform a method of any of aspects 14 through 25.

Aspect 30: An apparatus for road usage charging at a network entity, comprising at least one means for performing a method of any of aspects 14 through 25.

Aspect 31: A non-transitory computer-readable medium storing code for road usage charging at a network entity, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for road usage charging at a vehicle computing device (VCD), comprising:
receiving at least a first encryption key of a first charging entity for encryption of road usage charges associated with the first charging entity;
determining a first road usage charge associated with the first charging entity based at least in part on a first charge policy for road usage associated with the first charging entity;
encrypting the first road usage charge based at least in part on the first encryption key to generate an encrypted first road usage charge;
determining a total usage charge for road usage associated with the first charging entity and one or more other charging entities; and
transmitting the encrypted first road usage charge and other encrypted road usage charges in conjunction with an unencrypted total usage charge to a network entity.

2. The method of claim 1, further comprising:
encrypting at least a second road usage charge based at least in part on the first encryption key associated with the first charging entity or a second encryption key associated with a second charging entity to generate an encrypted second road usage charge, wherein the second road usage charge is either a real charge having a positive charge value or a false charge having a zero charge value; and
transmitting the encrypted second road usage charge along with the encrypted first road usage charge and the unencrypted total usage charge, to the network entity.

3. The method of claim 2, wherein the encrypted second road usage charge, the encrypted first road usage charge, and the unencrypted total usage charge are transmitted with an indication of a respective charging entity identification associated with each charge.

4. The method of claim 1, wherein the encrypted first road usage charge includes a charge amount and one or more of an identifier or charging policy identification associated with the first road usage charge, and wherein the network entity generates total of ciphertext charges for a given charging policy identification such that a given charger may be informed of revenue quantities as a function of charge policy.

5. The method of claim 1, wherein the first encryption key is associated with an additively homomorphic encryption (AHE) scheme, and wherein one or more other encryption keys are received for one or more other charging entities for reporting, using AHE, one or more other road usage charges.

6. The method of claim 1, further comprising:
receiving, from the first charging entity or from a service provider or network entity associated with one or more charging entities, the first charge policy associated with the first charging entity.

7. The method of claim 1, further comprising:
receiving one or more of an attestation check or an integrity check; and
transmitting a response to one or more of the attestation check or the integrity check, and wherein determination of first road usage charge at the VCD is enabled based at least in part on successful completion of one or more of the attestation check or the integrity check.

8. The method of claim 1, wherein the first charge policy includes one or more parameters that enable determination of the first road usage charge at the VCD based at least in part on one or more of a location of a vehicle associated with the VCD or a time at which the vehicle was at the location.

9. The method of claim 8, wherein the one or more parameters include roadway map information that enables the VCD to associate vehicle location data with the first charge policy to determine the first road usage charge.

10. The method of claim 8, further comprising:
cryptographically verifying that the first charge policy is valid prior to determining the first road usage charge using the first charge policy.

11. The method of claim 1, further comprising:
receiving the first charge policy from a network entity via one or more of a cellular interface, a vehicle-to-everything (V2X) interface, a roadside unit (RSU), a dedicated short range communications (DSRC) service, or point-to-point communication.

12. The method of claim 1, further comprising:
receiving one or more updates to one or more charge policies based at least in part on a location of a vehicle associated with the VCD, or based on an anonymous request from the VCD as a function of a current location or one or more planned locations of the vehicle associated with the VCD.

13. The method of claim 1, wherein the first charge policy includes one or more charging parameters that are based at least in part on a vehicle type of a vehicle associated with the VCD, a capability of the VCD to provide predefined inputs to a road usage charge according to the first charge policy, or any combinations thereof.

14. A method for road usage charging at a network entity, comprising:
providing to one or more vehicle-associated vehicle computing devices (VCDs), at least a first encryption key of a first charging entity for encryption of one or more road usage charge associated with the first charging entity for each VCD;
providing to the one or more vehicle-associated VCDs, a second encryption key of a second charging entity for encryption of one or more road usage charges associated with the second charging entity for each VCD;
receiving a first set of encrypted road usage charges from each VCD associated with the first charging entity and a second set of encrypted road usage charges from each VCD associated with the second charging entity;
receiving an unencrypted total charge from each VCD that indicates a VCD-specific sum of total road usage charges for all of the charging entities;
determining a first encrypted total road usage charge for the first charging entity based at least in part on each of the first sets of encrypted road usage charges associated with the first charging entity; and
determining a second encrypted total road usage charge for the second charging entity based at least in part on each of the second sets of encrypted road usage charges associated with the second charging entity.

15. The method of claim 14, wherein one of the first set of encrypted road usage charges or the second set of encrypted road usage charges is a false charge having a zero charge value that obscures information related to specific vehicle time and usage associated with one or more charging entities or associated charge policies.

16. The method of claim 14, wherein the network entity is a service provider that relays charge information to one or more of the first charging entity or the second charging entity, or is the first charging entity.

17. The method of claim 14, wherein the encrypted first encrypted total road usage charge further includes an indication of a first charge policy associated with the first charging entity that was used to compute the first encrypted total road usage charge.

18. The method of claim 14, wherein the first encryption key is associated with an additively homomorphic encryption (AHE) scheme.

19. The method of claim 14, further comprising:
providing the first encrypted total road usage charge to the first charging entity, and the second encrypted total road usage charge to the second charging entity;
receiving the first road usage charge and the second road usage charge from, respectively, the first charging entity and the second charging entity; and
verifying each of the first road usage charge and the second road usage charge based at least in part on a difference between the unencrypted total charge from the first VCD and a sum of the first road usage charge and the second road usage charge.

20. The method of claim 14, further comprising:
transmitting, to a vehicle operator associated with the VCD, a charge notice that corresponds to the sum of the total road usage charges for each charging entity.

21. The method of claim 14, further comprising:
transmitting, to the VCD, a first charge policy associated with the first charging entity, and wherein the VCD computes the first set of encrypted road usage charges that is reported to the first charging entity based at least in part on the first charge policy.

22. The method of claim 14, further comprising:
enabling assurance of correct self-reporting of at least the first set of encrypted road usage charges by the VCD based at least in part on an remote attestation, one or more integrity checks, or any combinations thereof.

23. The method of claim 14, further comprising:
providing, to the VCD, one or more road usage charge calculation test vectors and an indication to perform a self-test based on the charge calculation test vectors;
receiving, from the VCD, a calculated charge determined at the VCD based on the charge calculation test vectors; and
verifying that the VCD computes an accurate calculated charge.

24. The method of claim 14, wherein a first charge policy includes one or more parameters that enable determination of the first set of encrypted road usage charges at the VCD based at least in part on one or more of a location of a vehicle associated with the VCD, a time at which the vehicle was at the location, one or more road usage charge discounting policies, or any combinations thereof, and
wherein the one or more parameters allow the VCD to determine pre-trip, mid-trip, or post-trip, charge discounts that may be applied to individual or total road usage charges.

25. The method of claim 14, further comprising:
transmitting one or more updates to one or more charge policies based at least in part on a location of the vehicle associated with the VCD, a schedule, or based on an anonymous request from the VCD.

26. An apparatus for road usage charging at a vehicle computing device (VCD), comprising:
a processor;
memory coupled with the processor; and
instructions stored in the memory and executable by the processor to cause the apparatus to:
receive at least a first encryption key of a first charging entity for encryption of road usage charges associated with the first charging entity;
determine a first road usage charge associated with the first charging entity based at least in part on a first charge policy for road usage associated with the first charging entity;
encrypt the first road usage charge based at least in part on the first encryption key to generate an encrypted first road usage charge;
determine a total usage charge for road usage associated with the first charging entity and one or more other charging entities; and
transmit the encrypted first road usage charge and other encrypted road usage charges in conjunction with an unencrypted total usage charge to a network entity.

27. The apparatus of claim 26, wherein the instructions are further executable by the processor to cause the apparatus to:
encrypt the first encryption key associated with the first charging entity or a second encryption key associated with a second charging entity to generate an encrypted second road usage charge; and
transmit the encrypted second road usage charge along with the encrypted first road usage charge and the unencrypted total usage charge, to the network entity.

28. The apparatus of claim 27, wherein the encrypted second road usage charge, the encrypted first road usage charge, and the unencrypted total usage charge are transmitted with an indication of a respective charging entity identification associated with each charge.

29. An apparatus for road usage charging at a network entity, comprising:
a processor;
memory coupled with the processor; and
instructions stored in the memory and executable by the processor to cause the apparatus to:
provide to one or more vehicle-associated vehicle computing devices (VCDs), at least a first encryption key of a first charging entity for encryption of one or more road usage charge associated with the first charging entity for each VCD;
provide to the one or more vehicle-associated VCDs, a second encryption key of a second charging entity for encryption of one or more road usage charges associated with the second charging entity for each VCD;
receiving a first set of encrypted road usage charges from each VCD associated with the first charging entity and a second set of encrypted road usage charges from each VCD associated with the second charging entity;
receive an unencrypted total charge from each VCD that indicates a VCD-specific sum of total road usage charges for each charging entity;
determine a first encrypted total road usage charge for the first charging entity based at least in part on each of the first sets of encrypted road usage charges associated with the first charging entity; and
determine a second encrypted total road usage charge for the second charging entity based at least in part on each of the second sets of encrypted road usage charges associated with the second charging entity.

30. The apparatus of claim 29, wherein one of the first road usage charge or the second road usage charge is a false charge having a zero charge value that obscures information related to specific vehicle time and usage associated with one or more charging entities or associated charge policies.

* * * * *